(12) United States Patent
Kagawa

(10) Patent No.: US 8,103,149 B2
(45) Date of Patent: Jan. 24, 2012

(54) PLAYBACK SYSTEM, APPARATUS, AND METHOD, INFORMATION PROCESSING APPARATUS AND METHOD, AND PROGRAM THEREFOR

(75) Inventor: Yoshiaki Kagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 1556 days.

(21) Appl. No.: 11/506,809

(22) Filed: Aug. 21, 2006

(65) Prior Publication Data

US 2007/0047913 A1    Mar. 1, 2007

(30) Foreign Application Priority Data

Aug. 23, 2005   (JP) ................................. 2005-240562

(51) Int. Cl.
*H04N 9/80* (2006.01)

(52) U.S. Cl. ............ 386/261; 386/262; 725/38; 725/86; 707/732; 707/736; 707/737; 707/738; 707/752

(58) Field of Classification Search .................... 386/46, 386/52, 95, 96, 104, 124–126, 239, 261, 386/262; 707/705–708, 711–713, 722, 732–734, 707/736–738, 741, 752, 769, 770; 725/38, 725/88

See application file for complete search history.

(56) References Cited

U.S. PATENT DOCUMENTS

| | | | | |
|---|---|---|---|---|
| 5,634,849 A * | 6/1997 | Abecassis | ...................... | 463/30 |
| 6,973,256 B1 * | 12/2005 | Dagtas | ............................. | 386/46 |
| 2002/0166123 A1 * | 11/2002 | Schrader et al. | ................. | 725/58 |
| 2003/0101164 A1 * | 5/2003 | Pic et al. | ........................... | 707/1 |
| 2004/0040041 A1 * | 2/2004 | Crawford | ........................ | 725/88 |
| 2005/0084244 A1 | 4/2005 | Murabayashi | | |
| 2006/0031870 A1 * | 2/2006 | Jarman et al. | .................... | 725/25 |

FOREIGN PATENT DOCUMENTS

| | | |
|---|---|---|
| JP | 2004-140874 | 5/2004 |
| JP | 2005-65185 | 3/2005 |
| JP | 2005-167456 | 6/2005 |

* cited by examiner

*Primary Examiner* — Thai Tran
*Assistant Examiner* — Mishawn Dunn
(74) *Attorney, Agent, or Firm* — Oblon, Spivak, McClelland, Maier & Neustadt, L.L.P.

(57) ABSTRACT

A playback instruction data generator determines, for each type of exceptional and special playback, a portion of target content with specific details to be played back in exceptional and special playback of the target content, on the basis of a playback rule for the category of the target content, among playback rules defined for each category of content and for each type of exceptional and special playback, and generates playback instruction data in which portion-to-be-played information indicating that portion is associated with identification information identifying the target content. A data extracting unit extracts, from content specified by a user, a portion of the content with specific details indicated by the portion-to-be-played information for the type of exceptional and special playback specified by the user, the portion-to-be-played information being included in the playback instruction data and being associated with the identification information for the content specified by the user. The present invention is applicable to, for example, an apparatus that records and plays back content, such as images.

16 Claims, 12 Drawing Sheets

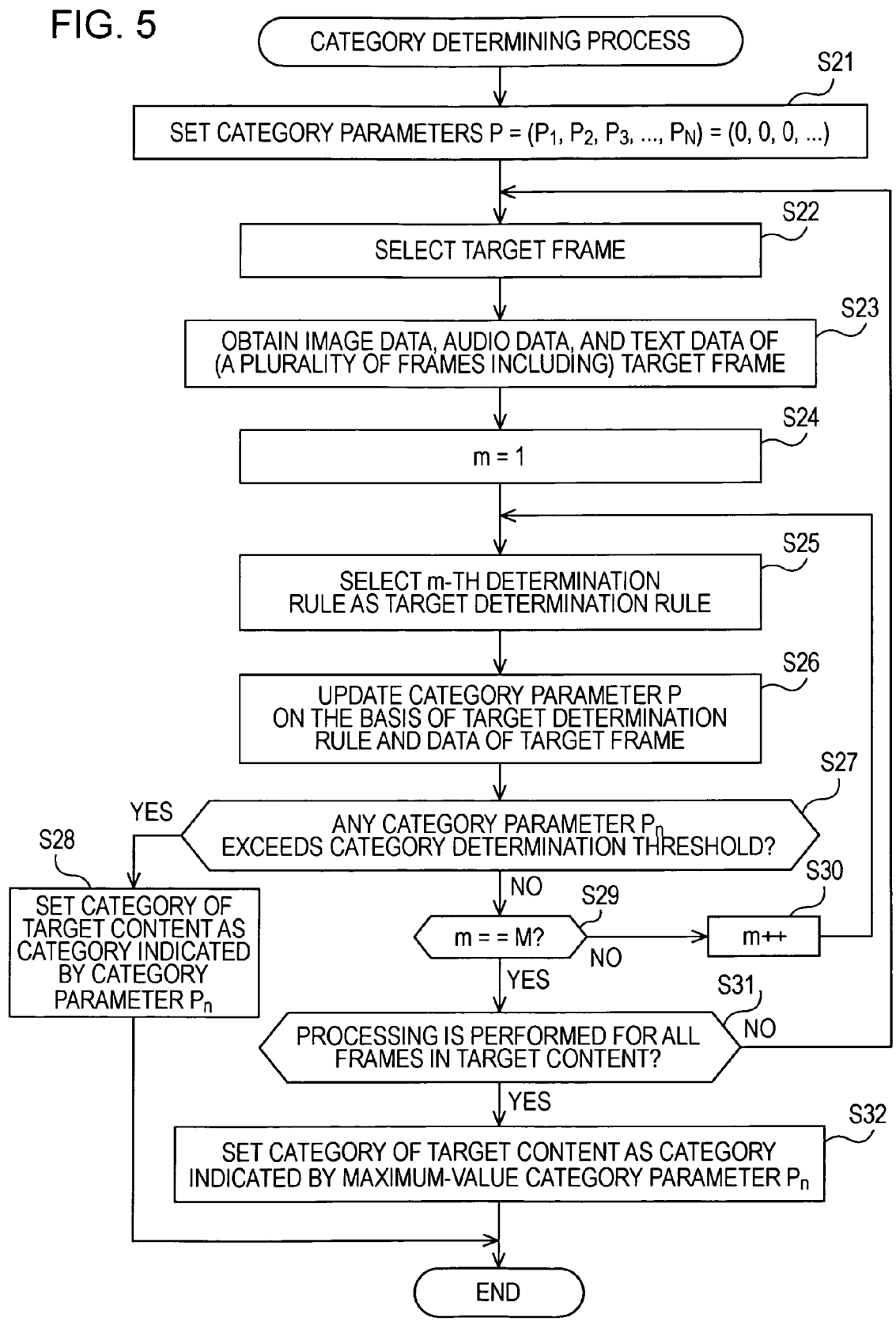

FIG. 6

| DETERMINATION RULES |
|---|
| • WHEN TEXT INCLUDES BASEBALL (LIVE), INCREASE THE POSSIBILITY OF BASEBALL BY 0.5 |
| • WHEN AUDIO IS DECODED TO INDICATE BASEBALL (LIVE), INCREASE THE POSSIBILITY OF BASEBALL BY 0.3 |
| • WHEN AN IMAGE IS ANALYZED AND DETERMINED AS A BASEBALL FIELD, INCREASE THE POSSIBILITY OF BASEBALL BY 0.2 |
| • WHEN AN IMAGE IS ANALYZED TO SHOW A BASEBALL UNIFORM, A BAT, AND A BALL, INCREASE THE POSSIBILITY OF BASEBALL BY 0.1 |
| • WHEN TEXT IS ANALYZED TO SHOW "SCRIPT" AS PART OF A TITLE, INCREASE THE POSSIBILITY OF DRAMA BY 0.2 |
| • WHEN AUDIO IS ANALYZED TO INDICATE DRAMA, INCREASE THE POSSIBILITY OF DRAMA BY 0.1 |
| • WHEN AN IMAGE IS ANALYZED AND THE FACE OF AN ACTOR OFTEN APPEARING IN DRAMA IS RECOGNIZED, INCREASE THE POSSIBILITY OF DRAMA BY 0.1 |
| ... |

FIG. 8

| CATEGORY \ PLAYBACK TYPE | ABSTRACT | HIGHLIGHT |
|---|---|---|
| BASEBALL | ░░ (PLAYBACK RULE SET) | |
| SOCCER | | |
| .... | .... | .... |

FIG. 10

| PLAYBACK RULES WHEN CATEGORY IS BASEBALL AND PLAYBACK TYPE IS ABSTRACT |
|---|
| • WHEN RUNS IN THE TARGET FRAME ARE DIFFERENT FROM RUNS IN THE IMMEDIATELY PRECEDING FRAME, INCREASE PREFERENCE POINTS OF THE TARGET FRAME BY 1000 |
| • WHEN A RUNNER IN THE TARGET FRAME IS DIFFERENT FROM THAT IN THE IMMEDIATELY PRECEDING FRAME, INCREASE PREFERENCE POINTS OF THE TARGET FRAME BY 100 |
| • WHEN THE LEVEL OF CHEERING IN THE TARGET FRAME IS HIGHER THAN THAT IN THE IMMEDIATELY PRECEDING FRAME, INCREASE PREFERENCE POINTS BY A VALUE CALCULATED BY DIVIDING THE DIFFERENCE BY THE MAXIMUM CHEERING LEVEL AND MULTIPLYING THE QUOTIENT BY 10 |
| • WHEN AUDIO IS ANALYZED TO DETECT A HIGH SOUND GENERATED UPON HITTING A BALL WITH A BAT, INCREASE PREFERENCE POINTS BY 1 |
| • WHEN THE NUMBER OF OUTS IN THE TARGET FRAME IS GREATER THAN THAT IN THE IMMEDIATELY PRECEDING FRAME, INCREASE PREFERENCE POINTS BY 5 |
| • WHEN THE NUMBER OF OUTS IN THE TARGET FRAME IS LESS THAN THAT IN THE IMMEDIATELY PRECEDING FRAME, INCREASE PREFERENCE POINTS BY 50 |
| ... |

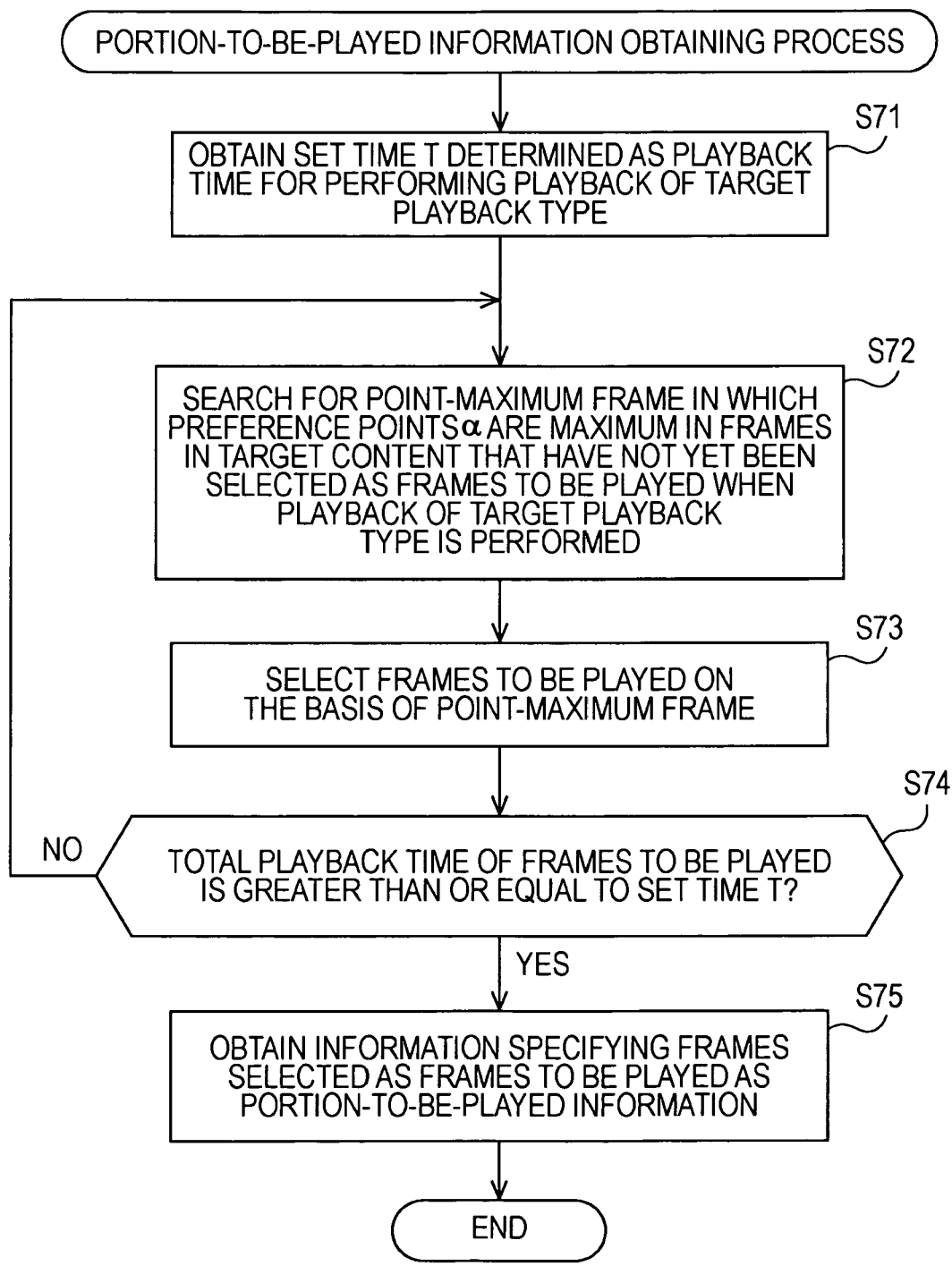

PLAYBACK SYSTEM, APPARATUS, AND METHOD, INFORMATION PROCESSING APPARATUS AND METHOD, AND PROGRAM THEREFOR

CROSS REFERENCES TO RELATED APPLICATIONS

The present invention contains subject matter related to Japanese Patent Application JP 2005-240562 filed in the Japanese Patent Office on Aug. 23, 2005, the entire contents of which are incorporated herein by reference.

BACKGROUND OF THE INVENTION

1. Field of the Invention

The present invention relates to playback systems, apparatuses, and methods, information processing apparatuses and methods, and programs therefor, and in particular, to a playback system, apparatus, and method, an information processing apparatus and method, and a program therefor for enhancing the usability of, for example, a content player.

2. Description of the Related Art

Players for playing back content such as moving images (including images and, if necessary, sounds accompanying the images), still images, sounds (including pieces of music or the like) include, for example, tape recorders (players) and disk recorders (players).

In addition to playing back content at a single speed in real time, such players can play back content in other special manners including, for example, high-speed playback such as double-speed playback (fast-forward), low-speed playback such as frame-by-frame advance and slow playback, pause (playback), and rewind.

For example, when a user wants to view desired content, the user can search for the desired content by high-speed playback. When there is a particular portion in the desired content that the user wants to view, the user can find this portion also by high-speed playback.

As recording media, such as hard disks (HDs), have recently significantly grown in capacity and dropped in price, disk recorders with large-capacity HDs have become widely used.

Such disk recorders with large-capacity HDs can record many pieces of content. Even with the high-speed playback described above, it is necessary for the user to make efforts to find a desired piece of content or a desired portion of a certain piece of content from among many pieces of content.

For example, in Japanese Unexamined Patent Application Publication 2005-65185, a ticker section including a ticker and a speaker's voice section including a speaker's voice are detected from content. The speaker's voice section and an overlapping section between the ticker section and the speaker's voice section are determined as a playback section for playing back the content, and this playback section is played back to perform digest playback.

Special playback performed by known players is playback performed at various speeds, such as high-speed playback and low-speed playback, and has no relationship with the details of content.

If it is possible to perform special playback according to the details of content, that is, if it is possible to perform playback in which data to be played back is determined (changed) according to the details of content, this is highly convenient.

Special playback according to the playback speed, such as high-speed playback and low-speed playback, is referred to as simple and special playback as necessary. Also, special playback according to the details of content is referred to as exceptional and special playback.

Such exceptional and special playback includes, for example, playback for playing back a portion of the specific details of content, such as abstract playback for playing back only scenes that help the user understand the outline of the entire content and highlight playback for playing back only highlight scenes of the content. With various types of exceptional and special playback including abstract playback and highlight playback, the usability of the player can be enhanced.

SUMMARY OF THE INVENTION

It is desirable to enhance the usability of a player.

According to a first embodiment of the present invention, there is provided a playback system for playing back content. The playback system includes the following elements: a category determining unit that determines the category of content; a playback instruction data generator that determines, for each type of special playback, a portion of target content with specific details to be played back in special playback of the target content, on the basis of a playback rule for the category of the target content, among playback rules, which are defined for each category of content and for each type of special playback according to the details of the content, for determining a portion of the content with specific details to be played back in special playback of the content, and that generates playback instruction data in which portion-to-be-played information indicating the portion of the target content with the specific details to be played back is associated with identification information identifying the target content; an obtaining unit that obtains the portion-to-be-played information for the type of special playback specified by a user, the portion-to-be-played information being included in the playback instruction data and being associated with the identification information for content specified by the user; and an extracting unit that extracts, from the content specified by the user, a portion of the content with specific details, which is indicated by the portion-to-be-played information obtained by the obtaining unit.

According to the playback system of the first embodiment, the category of content is determined. For each type of special playback, a portion of target content with specific details to be played back in special playback of the target content is determined on the basis of a playback rule for the category of the target content, among playback rules, which are defined for each category of content and for each type of special playback according to the details of the content, for determining a portion of the content with specific details to be played back in special playback of the content. Playback instruction data in which portion-to-be-played information indicating the portion of the target content with the specific details to be played back is associated with identification information identifying the target content is generated. The portion-to-be-played information for the type of special playback specified by a user, which is included in the playback instruction data and associated with the identification information for content specified by the user, is obtained. From the content specified by the user, a portion of the content with specific details, which is indicated by the portion-to-be-played information obtained by the obtaining unit is extracted.

Types of special playback include abstract may playback and highlight playback.

The category determining unit may determine the category on the basis of a result of recognizing characters, an image, or a sound included in the content. The category determining unit may determine the category using meta data or closed captions included in the content or program guide information.

The playback rules may be updated. The playback rules may be provided from a site on the Internet. The playback rules may be broadcast via data broadcasting and updated.

According to a second embodiment of the present invention, there is provided a playback apparatus for playing back content. The playback apparatus includes the following element: an obtaining unit that obtains, from playback instruction data in which portion-to-be-played information indicating, for each type of special playback, a portion of content with specific details to be played back in special playback according to the details of the content is associated with identification information identifying the content, the portion-to-be-played information for the type of special playback specified by a user, the portion-to-be-played information being associated with the identification information for content specified by the user; and an extracting unit that extracts, from the content specified by the user, a portion of the content with specific details, which is indicated by the portion-to-be-played information obtained by the obtaining unit.

The playback instruction data may be generated by determining, for each type of special playback, a portion of target content with specific details to be played back in special playback of the target content, on the basis of a playback rule for the category of the target content, among playback rules, which are defined for each category of content and for each type of special playback, for determining a portion of the content with specific details to be played back in special playback of the content, and by associating the portion-to-be-played information indicating the portion of the target content with the specific details to be played back with the identification information identifying the target content.

According to the second embodiment of the present invention, there is provided a method of playing back content or a program for allowing a computer to execute a process of playing back content. The method or the process includes the steps of: obtaining, from playback instruction data in which portion-to-be-played information indicating, for each type of special playback, a portion of content with specific details to be played back in special playback according to the details of the content is associated with identification information identifying the content, the portion-to-be-played information for the type of special playback specified by a user, the portion-to-be-played information being associated with the identification information for content specified by the user; and extracting, from the content specified by the user, a portion of the content with specific details, which is indicated by the obtained portion-to-be-played information.

According to the playback apparatus, the method, or the program of the second embodiment, from playback instruction data in which portion-to-be-played information indicating, for each type of special playback, a portion of content with specific details to be played back in special playback according to the details of the content is associated with identification information identifying the content, the portion-to-be-played information for the type of special playback specified by a user, which is associated with the identification information for content specified by the user, is obtained. From the content specified by the user, a portion of the content with specific details, which is indicated by the obtained portion-to-be-played information, is extracted.

According to a third embodiment of the present invention, there is provided an information processing apparatus for processing content. The information processing apparatus includes the following elements: a category determining unit that determines the category of content; and a playback instruction data generator that determines, for each type of special playback, a portion of target content with specific details to be played back in special playback of the target content, on the basis of a playback rule for the category of the target content, among playback rules, which are defined for each category of content and for each type of special playback according to the details of the content, for determining a portion of the content with specific details to be played back in special playback of the content, and that generates playback instruction data in which portion-to-be-played information indicating the portion of the target content with the specific details to be played back is associated with identification information identifying the target content.

The playback instruction data generator may generate the playback instruction data on the basis of information regarding a user viewing the content.

The playback instruction data generator may determine the portion of the target content with the specific details to be played back in the special playback of the target content so that the total playback time of playing back the portion of the target content with the specific details to be played back is a set time determined in advance or close to the set time.

According to the third embodiment of the present invention, there is provided an information processing method of processing content or a program for allowing a computer to perform an information processing process of processing content. The method or the process includes the steps of: determining the category of content; and determining, for each type of special playback, a portion of target content with specific details to be played back in special playback of the target content, on the basis of a playback rule for the category of the target content, among playback rules, which are defined for each category of content and for each type of special playback according to the details of the content, for determining a portion of the content with specific details to be played back in special playback of the content, and generating playback instruction data in which portion-to-be-played information indicating the portion of the target content with the specific details to be played back is associated with identification information identifying the target content.

According to the playback apparatus, the method, or the program of the third embodiment, the category of content is determined. For each type of special playback, a portion of target content with specific details to be played back in special playback of the target content is determined on the basis of a playback rule for the category of the target content, among playback rules, which are defined for each category of content and for each type of special playback according to the details of the content, for determining a portion of the content with specific details to be played back in special playback of the content. Playback instruction data in which portion-to-be-played information indicating the portion of the target content with the specific details to be played back is associated with identification information identifying the target content is generated.

According to the first to third embodiments of the present invention, the usability of the player can be enhanced.

BRIEF DESCRIPTION OF THE DRAWINGS

FIG. 5 is a flowchart of a category determining process;

FIG. 6 is a diagram showing examples of determination rules;

FIG. 8 is a diagram showing examples of playback rules;

FIG. 10 is a diagram showing examples of rule sets;

FIG. 11 is a flowchart of a portion-to-be-played information obtaining process.

DESCRIPTION OF THE PREFERRED EMBODIMENTS

Figure 1:
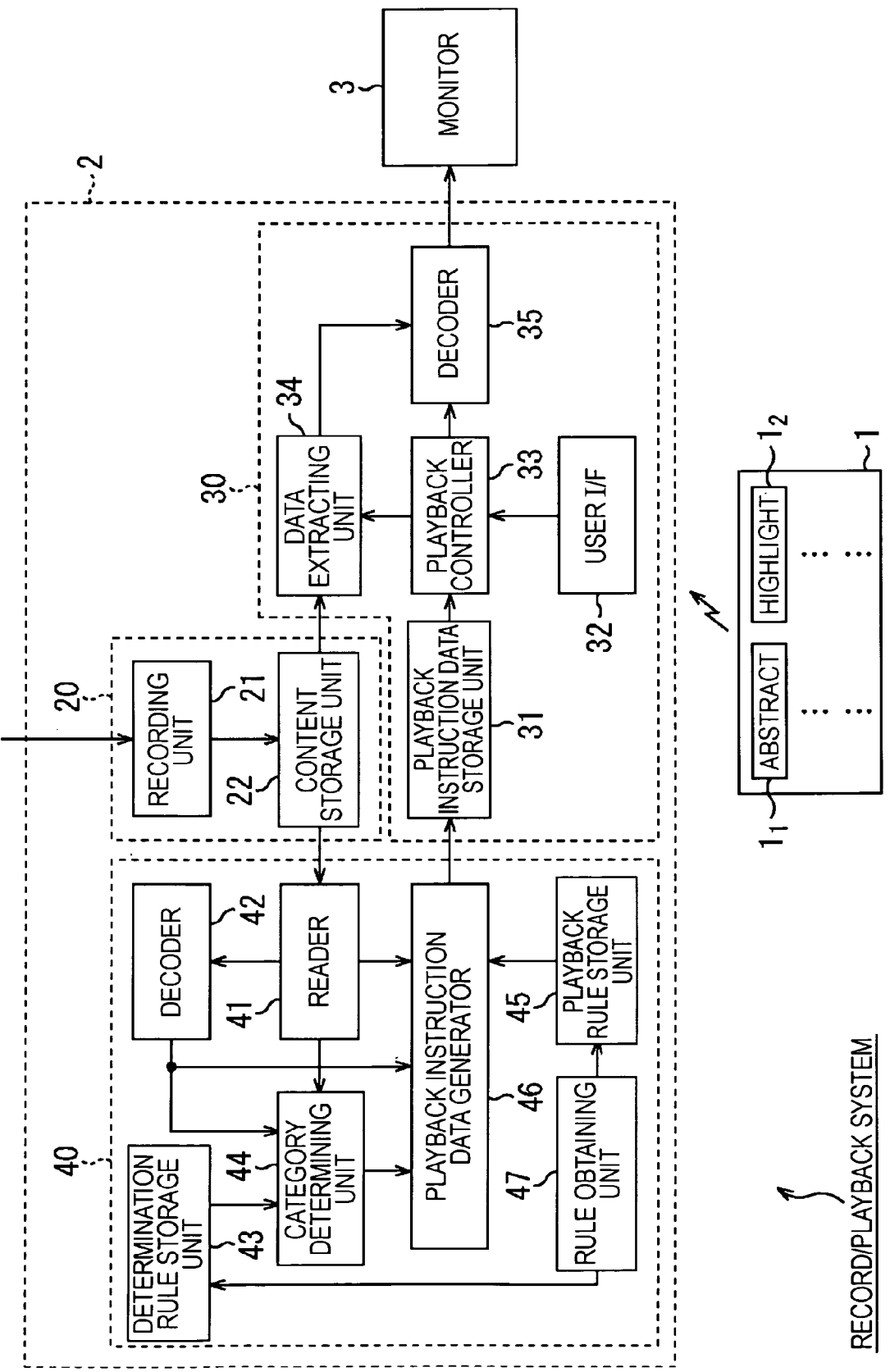
FIG. 1 is a block diagram of an example of the configuration of a record/playback system according to an embodiment of the present invention.

Before describing preferred embodiments of the present invention, the correspondence between the features of the present invention and embodiments described in the description of the preferred embodiments will be discussed below. This description is intended to assure that embodiments supporting the invention are described in the description of the preferred embodiments. Thus, even if an embodiment described in the description of the preferred embodiments is not described here as relating to an embodiment corresponding to a feature of the present invention, this does not mean that the embodiment does not relate to that feature of the present invention. In contrast, even if an embodiment is described here as relating to a feature of the present invention, this does not mean that the embodiment does not relate to other features of the present invention.

According to a first embodiment of the present invention, there is provided a playback system (e.g., a record/playback system shown in FIG. 1) for playing back content. The playback system includes the following elements: a category determining unit (e.g., a category determining unit 44 shown in FIG. 1) that determines the category of content; a playback instruction data generator (e.g., a playback instruction data generator 46 shown in FIG. 1) that determines, for each type of special playback, a portion of target content with specific details to be played back in special playback of the target content, on the basis of a playback rule for the category of the target content, among playback rules, which are defined for each category of content and for each type of special playback according to the details of the content, for determining a portion of the content with specific details to be played back in special playback of the content, and that generates playback instruction data in which portion-to-be-played information indicating the portion of the target content with the specific details to be played back is associated with identification information identifying the target content; an obtaining unit (e.g., a playback controller 33 shown in FIG. 1) that obtains the portion-to-be-played information for the type of special playback specified by a user, the portion-to-be-played information being included in the playback instruction data and being associated with the identification information for content specified by the user; and an extracting unit (e.g., a data extracting unit 34 shown in FIG. 1) that extracts, from the content specified by the user, a portion of the content with specific details, which is indicated by the portion-to-be-played information obtained by the obtaining unit.

According to a second embodiment of the present invention, there is provided a playback apparatus (e.g., a player shown in FIG. 1) for playing back content. The playback apparatus includes the following elements: an obtaining unit (e.g., the playback controller 33 shown in FIG. 1) that obtains, from playback instruction data in which portion-to-be-played information indicating, for each type of special playback, a portion of content with specific details to be played back in special playback according to the details of the content is associated with identification information identifying the content, the portion-to-be-played information for the type of special playback specified by a user, the portion-to-be-played information being associated with the identification information for content specified by the user; and an extracting unit (e.g., the data extracting unit 34 shown in FIG. 1) that extracts, from the content specified by the user, a portion of the content with specific details, which is indicated by the portion-to-be-played information obtained by the obtaining unit.

According to the second embodiment of the present invention, there is provided a method of playing back content or a program for allowing a computer to execute a process of playing back content. The method or the process includes the steps of: obtaining, from playback instruction data in which portion-to-be-played information indicating, for each type of special playback, a portion of content with specific details to be played back in special playback according to the details of the content is associated with identification information identifying the content, the portion-to-be-played information for the type of special playback specified by a user, the portion-to-be-played information being associated with the identification information for content specified by the user (e.g., step S1 of FIG. 3); and extracting, from the content specified by the user, a portion of the content with specific details, which is indicated by the obtained portion-to-be-played information (e.g., step S2 of FIG. 3).

According to a third embodiment of the present invention, there is provided an information processing apparatus (e.g., a generator 40 shown in FIG. 1) for processing content. The information processing apparatus includes the following elements: a category determining unit (e.g., the category determining unit 44 shown in FIG. 1) that determines the category of content; and a playback instruction data generator (e.g., the playback instruction data generator 46 shown in FIG. 1) that determines, for each type of special playback, a portion of target content with specific details to be played back in special playback of the target content, on the basis of a playback rule for the category of the target content, among playback rules, which are defined for each category of content and for each type of special playback according to the details of the content, for determining a portion of the content with specific details to be played back in special playback of the content, and that generates playback instruction data in which portion-to-be-played information indicating the portion of the target content with the specific details to be played back is associated with identification information identifying the target content.

According to the third embodiment of the present invention, there is provided an information processing method of processing content or a program for allowing a computer to perform an information processing process of processing content. The method or the program includes the steps of: determining the category of content (e.g., step S12 in FIG. 4); and determining, for each type of special playback, a portion of target content with specific details to be played back in special playback of the target content, on the basis of a playback rule for the category of the target content, among playback rules, which are defined for each category of content and for each type of special playback according to the details of the content, for determining a portion of the content with specific details to be played back in special playback of the content, and generating playback instruction data in which portion-to-be-played information indicating the portion of the target content with the specific details to be played back is associated with identification information identifying the target content (e.g., step S13 of FIG. 4).

With reference to the drawings, the embodiments of the present invention will be described below.

FIG. 1 shows an example of the configuration of a record/playback system according to an embodiment of the present invention.

Referring to FIG. 1, the record/playback system includes a remote commander 1, a recorder/player 2, and a monitor 3.

The remote commander 1 is provided with various buttons to be operated by a user. When the user presses one of the buttons, the remote commander 1 transmits an operation signal in response to the pressing of the button to the recorder/player 2 via infrared or the like.

With continued reference to FIG. 1, the remote commander 1 includes an abstract button 11 to be operated to cause the recorder/player 2 to perform abstract playback, which is one type of exceptional and special playback, and a highlight button 12 to be operated to cause the recorder/player 2 to perform highlight playback, which is another type of exceptional and special playback. Although not shown in the drawing, the remote commander 1 further includes, in addition to the abstract button 11 and the highlight button 12, for example, a power button to be operated to turn on and off the recorder/player 2, a play button to be operated to cause the recorder/player 2 to perform normal playback (single-speed playback), and a record button to be operated to cause the recorder/player 2 to record content.

The recorder/player 2 includes a recorder 20, the player 30, and the generator 40. In FIG. 1, the recorder 20, the player 30, and the generator 40 included in the recorder/player 2 are contained in the same housing. Alternatively, the recorder 20, the player 30, and the generator 40 can be independent units contained in individual housings. In the latter case, the recorder 20, the player 30, and the generator 40 are connected to one another via cables, a network, or the like.

The recorder 20 includes a recording unit 21 and a content storage unit 22 and records, for example, content including moving images serving as a television broadcast program input from an external source, moving images captured with a video camera, or moving images serving as a television broadcast program received by an internal tuner (not shown) included in the recorder/player 2.

That is, content to be recorded is supplied to the recording unit 21. The recording unit 21 controls the content storage unit 22 to record (data in) the content supplied to the recording unit 21 in the content storage unit 22.

The content storage unit 22 includes a magnetic disk, such as an HD. Alternatively, the content storage unit 22 may include a recording medium (storage medium) such as an optical disk, a magneto-optical disk, a magnetic tape, a phase change disk, or a semiconductor memory. It is preferable that the content storage unit 22 be a random-access recording medium.

The player 30 plays back content recorded in the content storage unit 22 and supplies the content to the monitor 3.

That is, the player 30 includes a playback instruction data storage unit 31, a user interface (I/F) 32, the playback controller 33, the data extracting unit 34, and a decoder 35.

The playback instruction data storage unit 31 stores playback instruction data, which will be described subsequently.

The user IF 32 receives an operation signal transmitted from the remote commander 1 and supplies the operation signal to the playback controller 33.

In response to the operation signal supplied from the user IF 32, the playback controller 33 controls playback of the content recorded in the content storage unit 22. That is, the playback controller 33 refers to the playback instruction data stored in the playback instruction data storage unit 31 if necessary and controls the data extracting unit 34 and the decoder 35, thereby playing back the content recorded in the content storage unit 22.

Under the control of the playback controller 33, the data extracting unit 34 extracts (reads) a portion to be played back from the content stored in the content storage unit 22 and supplies the portion to the decoder 35.

Under the control of the playback controller 33, the decoder 35 decodes the content supplied from the data extracting unit 34 if the content has been encoded and supplies, for example, images and sounds of the content, which are obtained as a result of decoding the content, to the monitor 3.

The generator 40 generates playback instruction data for the content recorded in the content storage unit 22.

That is, the generator 40 includes a reader 41, a decoder 42, a determination rule storage unit 43, the category determining unit 44, a playback rule storage unit 45, the playback instruction data generator 46, and a rule obtaining unit 47.

From among pieces of content recorded in the content storage unit 22, the reader 41 reads content for which playback instruction data is to be generated as target content and supplies the target content to the decoder 42, the category determining unit 44, and the playback instruction data generator 46.

The decoder 42 decodes the target content supplied from the reader 41 if the target content has been encoded and supplies, for example, images and sounds of the content, which are obtained as a result of decoding the content, to the category determining unit 44 and the playback instruction data generator 46.

The decoder 42 and the decoder 35 described above may be implemented by one decoder.

The determination rule storage unit 43 stores determination rules serving as knowledge to be referred if necessary when the category determining unit 44 determines the category of content.

Using the images and sounds of the target content, which are supplied from the decoder 42, the category determining unit 44 refers to the determination rules stored in the determination rule storage unit 43 if necessary and determines the category of the content. That is, when the target content includes moving images of a television broadcast program, the category determining unit 44 determines the category such as "news", "movie", "baseball", "golf", "soccer", "variety", or the like and outputs (supplies) the determination result to the playback instruction data generator 46.

The category determining unit 44 recognizes, for example, characters included in images of the target content (character recognition) or sounds of the target content (sound recognition) and determines the category of the target content on the basis of the recognition result. That is, the category determining unit 44 recognizes characters or objects included in images of the target content (character recognition or image recognition) and, when the recognition result shows the logo of a professional baseball team, determines the category of the target content as "baseball".

When the target content supplied from the reader 41 includes, for example, meta data such as title data or text data such as closed captions, the category determining unit 44 may also use the meta data or the closed captions to determine the category of the target content. When the target content is a television broadcast program, the category determining unit 44 may also use electronic program guide (EPG) information including information regarding the television broadcast program to determine the category of the television broadcast program serving as the target content.

The category determining unit 44 may output the most detailed category or a sort of a hierarchical determination result as the result of determining the category of the target content. That is, in the case of a baseball program, which is a television broadcast program for broadcasting a baseball game live, the most detailed category is "baseball". At the same time, the baseball program is a program that belongs to the upper category "sport". Thus, the result of determining the category of the baseball program may be "baseball", which is the most detailed category, or "baseball" belonging to "sport", which is a hierarchical determination result.

The playback rule storage unit 45 stores playback rules for use in generating playback instruction data for the target content by the playback instruction data generator 46.

The playback rules are defined for each category of content and for each type of exceptional and special playback. That is, for example, in the case where the categories of content include "baseball" and "golf" and the types of exceptional and special playback include abstract playback and highlight playback, for the category "baseball", the playback rules are defined for abstract playback and highlight playback, and, for the category "golf", the playback rules are defined for abstract playback and highlight playback.

The playback rules are a sort of knowledge for determining a portion of content with specific details to be played back in exceptional and special playback of the content.

Specifically, for example, in the case of a baseball program, experience shows that important scenes often appear near the end of each inning. The important scenes may serve as "highlight scenes". Therefore, a playback rule in the case where the category is "baseball" and the type of exceptional and special playback is "highlight playback" defines, for example, playback of a scene immediately before or after the end of each inning.

For example, in the case of a news program, experience shows that the outline of all news stories is often introduced at the beginning of a program. Also, the abstract of each news story is often given at the beginning thereof. Therefore, the overall outline of a news program can be understood by watching the outline and the abstract. Thus, a playback rule in the case where the category is "news" and the type of exceptional and special playback is "abstract playback" defines, for example, playback of the beginning of a news program and the beginning of each news story.

In the case of private content including moving images captured by a user using a video camera, when the main part of the content includes a person, that is, when a person appears in most scenes, experience shows that the details the content can be summarized by mainly gathering scenes of close-ups of a specific person. Therefore, in the case where the category is "private" indicating that the content is private content captured by the user and the type of exceptional and special playback is "abstract playback", a playback rule defines, for example, playback of scenes of close-ups of a specific person.

On the basis of the playback rule, among playback rules stored in the playback rule storage unit 45, for the category of the target content supplied from the category determining unit 44, the playback instruction data generator 46 determines, for each type of exceptional and special playback, a portion of the target content with specific details to be played back in exceptional and special playback of the target content and generates playback instruction data in which portion-to-be-played information indicating the portion of the target content with the specific details to be played back is associated with identification information identifying the target content.

As has been described above, for each type of exceptional and special playback, the playback instruction data generator 46 determines a portion of target content with specific details to be played back in exceptional and special playback of the target content. This determination is made on the basis of the results of sound recognition, image recognition, and character recognition performed using images and sounds of the target content, which are supplied from the decoder 42, and meta data and text data of closed captions included in the target content, which are supplied from the reader 41.

The playback instruction data generator 46 supplies the playback instruction data generated for the target content to the playback instruction data storage unit 31, and the playback instruction data storage unit 31 stores the supplied playback instruction data.

The rule obtaining unit 47 obtains new determination rules and new playback rules and additionally stores the new determination rules and the new playback rules in the determination rule storage unit 43 and the playback rule storage unit 45, respectively, or updates the rules stored in the determination rule storage unit 43 and the playback rule storage unit 45 using the new determination rules and the new playback rules.

New determination rules and new playback rules can be obtained from, for example, a site on the Internet. In this case, the rule obtaining unit 47 obtains new determination rules and new playback rules by downloading them from a site. Also, new determination rules and new playback rules can be broadcast by, for example, data broadcasting or the like. In this case, the rule obtaining unit 47 obtains new determination rules and new playback rules that have been broadcast by receiving them. When new determination rules or the like are recorded on a recording medium and supplied to the rule obtaining unit 47, the rule obtaining unit 47 obtains the new determination rules or the like from the recording medium by playing the recording medium.

Figure 2:
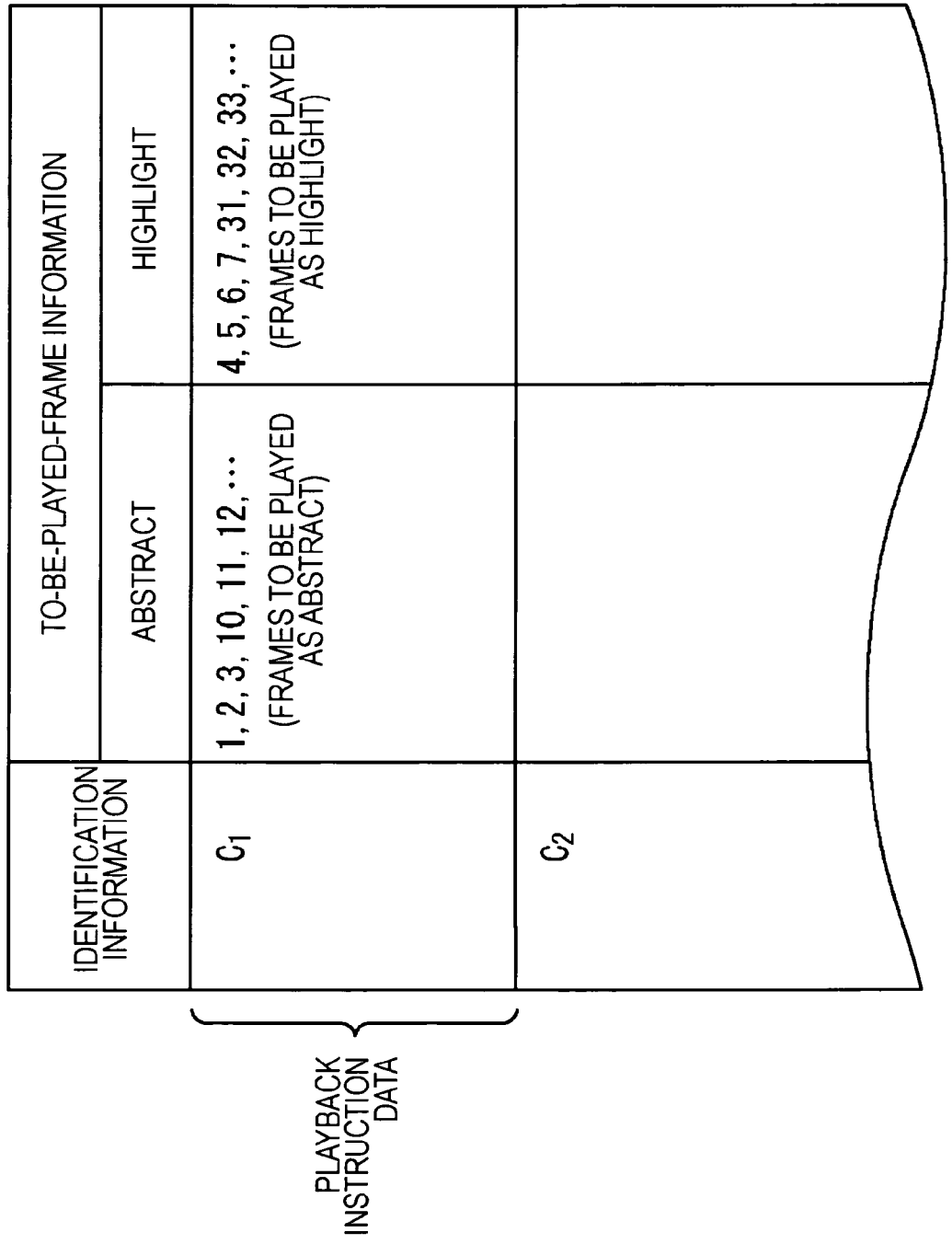
FIG. 2 is a diagram showing an example of playback instruction data.

FIG. 2 schematically shows playback instruction data stored in the playback instruction data storage unit 31.

In the playback instruction data, as has been described above, identification information identifying content is associated with portion-to-be-played information indicating a portion of the content with specific details to be played back in exceptional and special playback of the content.

When content is recorded (stored) as a file in the content storage unit 22, identification information identifying the content includes the file name of the file. In addition, the identification information identifying the content includes unique information identifying the content recorded in the content storage unit 22. That is, for example, when content is a television broadcast program, the identification information includes a broadcast start date or a broadcast channel.

Portion-to-be-played information may include arbitrary information that can indicate a portion of content. That is, when content includes, for example, moving images, the minimum unit of a portion of the content is a frame (or a field). Therefore, portion-to-be-played information may include the number of frames (n-th frame), which constitute moving images serving as content, counted from the first frame of the content, a time code, or the like.

In playback instruction data, there is portion-to-be-played information for each type of exceptional and special playback. That is, in the record/playback system shown in FIG. 1, the types of exceptional and special playback include abstract playback and highlight playback. In abstract playback, only scenes that help the user understand the outline of the entire content are played back so that the user can understand the outline of the entire content. In highlight playback, only highlight scenes of the content are played back. Therefore, different portions of content are played back when abstract playback and highlight playback of the content are performed. Thus, there is portion-to-be-played information for each type of exceptional and special playback.

With continued reference to FIG. 2, portion-to-be-played information includes the number of frames, counted from the first frame of content (hereinafter may also be referred to as "the frame number"). In FIG. 2, playback instruction data in the first row from the top includes identification information $c_1$. In the case of abstract playback, the frame numbers 1, 2, 3, 10, 11, 12, . . . serving as portion-to-be-played information indicating portions to be played back in abstract playback of content identified by the identification information $c_1$ are associated with the identification information $c_1$. In the case of highlight playback, the frame numbers 4, 5, 6, 7, 31, 32, 33, . . . serving as portion-to-be-played information indicating portions to be played back in highlight playback of the content identified by the identification information $c_1$ are associated with the identification information $c_1$.

In abstract playback of the content identified by the identification information $c_1$, the first, second, third tenth, eleventh, twelfth . . . frames from the beginning of the content are played back. In highlight playback of the content identified by the identification information c1, the fourth, fifth, sixth, seventh, thirty-first, thirty-second . . . frames from the beginning of the content are played back.

When a portion of content to be played back in exceptional and special playback is a so-called scene including successive frames, portion-to-be-played information may be the frame numbers of the first and the last frame of the scene. A portion of content to be played back in exceptional and special playback may include one scene or a plurality of scenes.

In playback instruction data, a portion of content indicated by portion-to-be-played information for each type of exceptional and special playback has specific details appropriate for each type of exceptional and special playback.

That is, for example, when content is a baseball program, runs in a game or the outline of the course of a game can be understood by watching scenes of a scoreboard in each inning. Therefore, a portion to be played back in abstract playback in the case where content is a baseball program includes, for example, scenes of a scoreboard, and the frame numbers of frames constituting these scenes serve as portion-to-be-played information.

A portion to be played back in highlight playback in the case where content is a baseball program includes, for example, scenes of home runs and/or hits, and the frame numbers of frames constituting these scenes serve as portion-to-be-played information.

Figure 3:
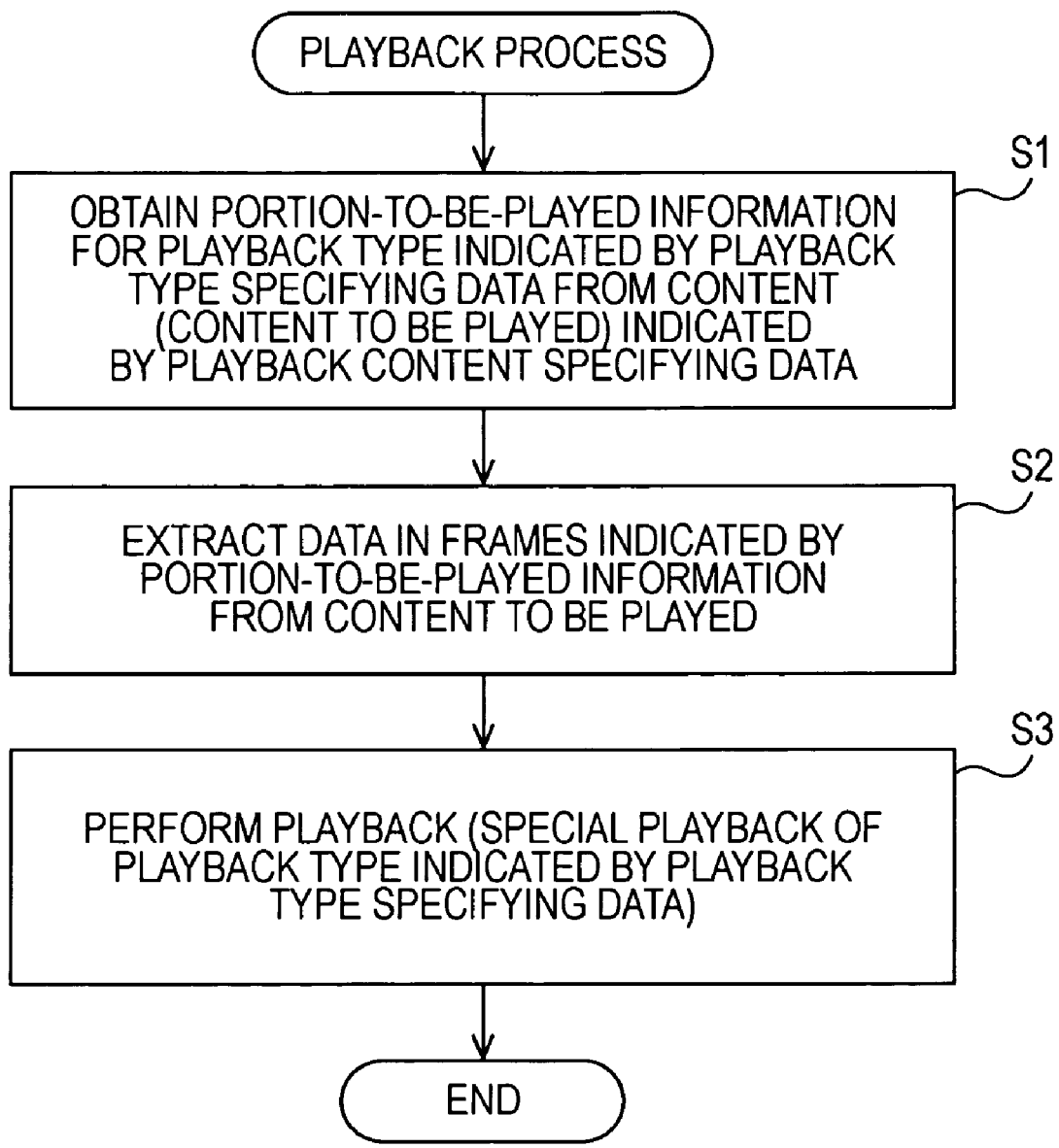
FIG. 3 is a flowchart of a playback process.

With reference to the flowchart of FIG. 3, an exceptional and special playback process performed by the player 30 shown in FIG. 1 will be described.

The type of exceptional and special playback may also be referred to as the "playback type". In this case, there are two playback types: abstract playback and highlight playback, which have been described above.

It is assumed that content to be played back in exceptional and special playback has already been stored in the content storage unit 22. In addition, it is assumed that playback instruction data for the content stored in the content storage unit 22 has already been stored in the playback instruction data storage unit 31.

When the user operates the remote commander 1 to specify content to be played back in exceptional and special playback and to specify the playback type of exceptional and special playback, the remote commander 1 transmits playback content specifying data indicating the content to be played back in exceptional and special playback and playback type specifying data indicating the playback type. The playback content specifying data and the playback type specifying data transmitted by the remote commander 1 is received by the user IF 32 and supplied to the playback controller 33.

The playback controller 33 controls the data extracting unit 34 to start reading the content indicated by the playback content specifying data from the user IF 32 (hereinafter may also be referred to as the "content to be played back"). Accordingly, the data extracting unit 34 starts reading the content to be played back from the content storage unit 22.

In step S1, the playback controller 33 reads and obtains, from portion-to-be-played information associated with identification information for content to be played back, which is included in playback instruction data stored in the playback instruction data storage unit 31, portion-to-be-played information for the playback type indicated by the playback type specifying data from the user IF 32 and supplies the obtained portion-to-be-played information to the data extracting unit 34 and the decoder 35. Then, the flow proceeds to step S2.

In step S2, the data extracting unit 34 extracts, from (data of) the content to be played back, which has been read from the content storage unit 22, data necessary for decoding a portion indicated by the portion-to-be-played information from the playback controller 33 and starts supplying the extracted data to the decoder 35. Then, the flow proceeds to step S3.

In step S3, the decoder 35 decodes the data supplied from the data extracting unit 34 and starts outputting, from among images and sounds obtained as a result of decoding the data supplied from the data extracting unit 34, images and sounds indicated by the portion-to-be-played information from the playback controller 33 to the monitor 3. Accordingly, the monitor 3 plays back images and sounds in the portion of the content to be played back, which is indicated by the portion-to-be-played information for the playback type indicated by the playback type specifying data. That is, the monitor 3 performs exceptional and special playback of the playback type indicated by the playback type specifying data.

When the portion of the content to be played back, which is indicated by the portion-to-be-played information for the playback type indicated by the playback type specifying data, includes, for example, a plurality of scenes (chapters), the decoder 35 generates a so-called film roll image, which is an image of (images of), for example, the first frames of the plurality of scenes, which are arranged in the shape of a film roll, and outputs the film roll image to the monitor 3, which in turn displays the film roll image.

In this case, the user looks at the film roll image and can understand the details of each scene to be played back in exceptional and special playback of the playback type indicated by the playback type specifying data.

In the case where a film roll image is generated, as has been described above, exceptional and special playback of the playback type indicated by the playback type specifying data can be started when the user operates the remote commander 1 so as to enable the user to decide to perform exceptional and special playback.

In this case, the user can determine whether to perform exceptional and special playback after having understood the details of each scene to be played back in exceptional and special playback of the playback type indicated by the playback type specifying data.

Next, when playback instruction data for content has been generated in advance by a person who has generated the content at the time of generation or editing of the content, this playback instruction data can be obtained and stored in the playback instruction data storage unit 31 in the record/playback system shown in FIG. 1.

When the playback instruction data generated in advance is supplied with the content (for example, the playback instruction data is contained in or broadcast with the content), the playback instruction data for the content can be obtained at the same time as obtaining the content (recording the content in the content storage unit 22). When the playback instruction data generated in advance is supplied from, for example, a site, the playback instruction data can be obtained by downloading it from the site.

In some cases, no playback instruction data for content is generated by a person who has generated the content. In such cases, playback instruction data for content can be generated in the record/playback system shown in FIG. 1.

That is, the generator 40 in the record/playback system shown in FIG. 1 can perform a generation process of generating playback instruction data for content recorded in the content storage unit 22.

With reference to the flowchart of FIG. 4, the generation process will be described.

In step S11 of the generation process, the reader 41 selects, from among pieces of content stored in the content storage unit 22, a piece of content for which playback instruction data has not been stored in the playback instruction data storage unit 31 as target content for which playback instruction data is to be generated, and the reader 41 reads the target content from the content storage unit 22 and supplies the target content to the decoder 42, the category determining unit 44, and the playback instruction data generator 46.

Upon reception of the target content from the reader 41, the decoder 42 decodes the target content and supplies the decoded target content to the category determining unit 44 and the playback instruction data generator 46.

In step S12, the category determining unit 44 performs a category determining process of determining the category of the target content by using the decoding result of the target content, which is supplied from the decoder 42, and meta data or the like included in the target content, which is supplied from the reader 41, and, if necessary, by referring to the determination rules stored in the determination rule storage unit 43. The category determining unit 44 supplies the category of the target content (determination result), which is obtained as a result of the category determining process, to the playback instruction data generator 46, and the flow proceeds from step S12 to step S13.

In step S13, the playback instruction data generator 46 performs a playback instruction data generating process of determining a portion of the target content with specific details to be played back in exceptional and special playback of the target content on the basis of a playback rule for the category of the target content, which is supplied from the category determining unit 44, among the playback rules stored in the playback rule storage unit 45, by using the images and sounds of the target content, which are supplied from the decoder 42, and, if necessary, by using the meta data or the like included in the target content, which is supplied from the reader 41, and generating playback instruction data in which portion-to-be-played information indicating the portion of the target content having the specific details to be played back is associated with identification information identifying the target content.

Then, the flow proceeds from step S13 to step S14, and the playback instruction data generator 46 supplies the playback instruction data for the target content, which has been obtained as a result of the playback instruction data generating process in step S13, to the playback instruction data storage unit 31. The playback instruction data storage unit 31 registers (stores) the playback instruction data for the target content, and the generation process ends.

Figure 4:
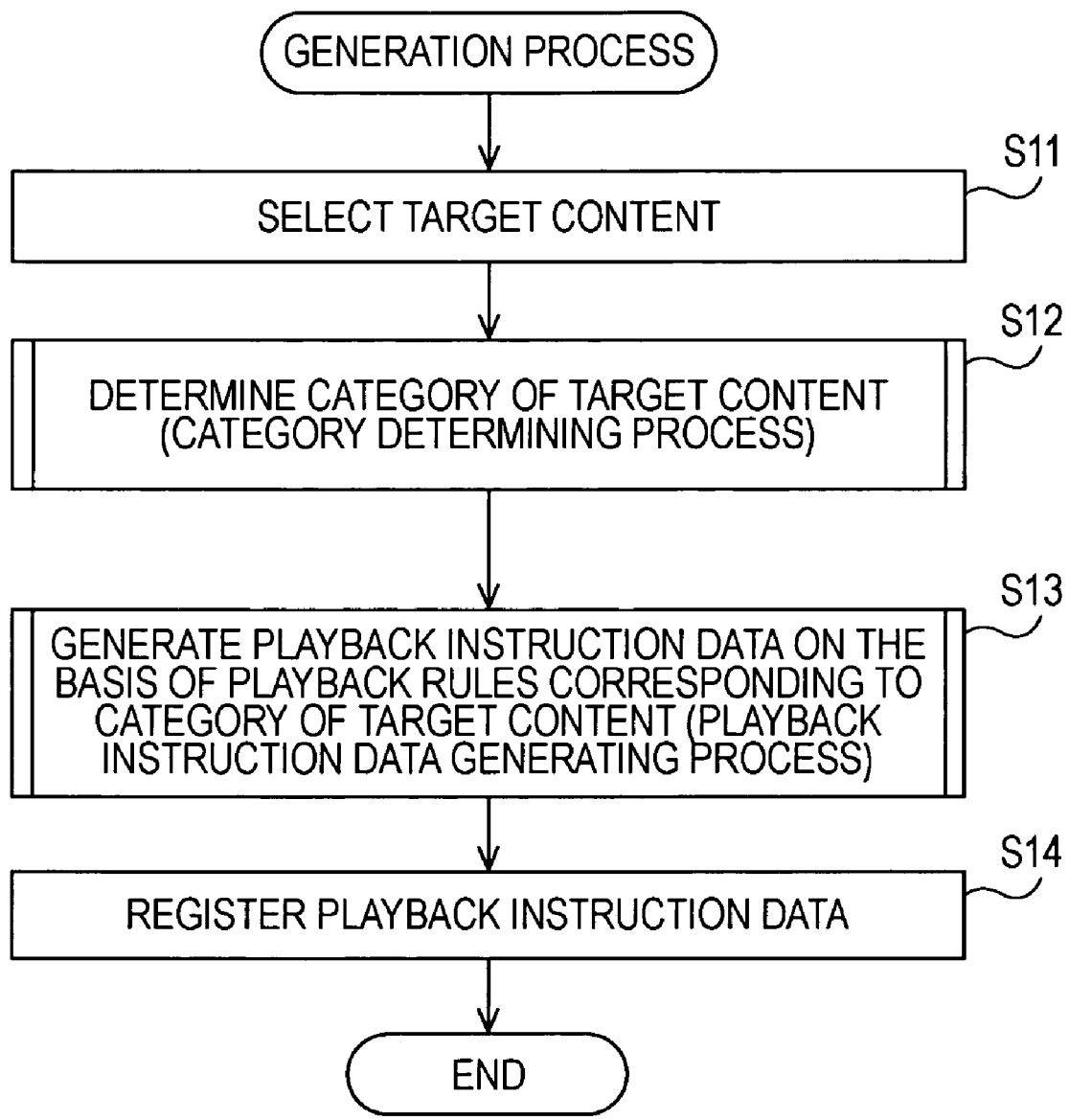
FIG. 4 is a flowchart of a generation process.

The generation process in FIG. 4 is repeated if necessary. The generation process in FIG. 4 may be performed at an arbitrary timing after the target content has been recorded in the content storage unit 22 or in parallel with the recording of the target content in the content storage unit 22. The generation process in FIG. 4 may also be performed in parallel with the playback process shown in FIG. 3 in which exceptional and special playback of content to be played back (content indicated by playback content specifying data) serving as target content is performed.

When content recorded in the content storage unit 22 includes, for example, high-bit-rate data and low-bit-rate data, that is, high-bit-rate data serving as the original data in the content (hereinafter referred to as "main data") and low-bit-rate data generated by reducing the amount of data of the main data, which is for use in proxy editing or the like (hereinafter referred to as "proxy data"), the generation process in FIG. 4 may be performed using the proxy data of the content. By performing the generation process in FIG. 4 using the proxy data instead of the main data of the content, the load of the generation process can be reduced.

With reference to the flowchart of FIG. 5, the category determining process performed by the category determining unit 44 in step S12 of FIG. 4 will be described in detail.

In the following, it is assumed that target content (content for which playback instruction data is to be generated) includes, for example, moving images.

In step S21 in the category determining process, the category determining unit 44 sets zero serving as the initial value to category parameters $P_1, P_2, \ldots, P_N$ each indicating the possibility of the category of the target content being category #1, #2, . . . , #N, and the flow proceeds to step S22.

The category parameter $P_1$ indicates the possibility of the category of the target content being, for example, drama. The category parameter $P_2$ indicates the possibility of the category of the target content being, for example, baseball. The category parameter $P_3$ indicates the possibility of the category of the target content being, for example, news. Similarly, the category parameters $P_4$ to $P_N$ each indicate the possibility of the category of the target content being a certain associated category.

In step S22, the category determining unit 44 selects a certain frame of the target content as a target frame. That is, in step S22, from among time-series frames constituting the target content, the most preceding (past) frame in the time domain that has not yet been selected as a target frame is selected as the target frame.

Then, the flow proceeds from step S22 to step S23. The category determining unit 44 obtains, from the target content supplied from the reader 41 and the decoding result of the target content, which has been supplied from the decoder 42, image data of the target frame, audio data accompanying a plurality of frames including, preceding, and succeeding the target frame, and closed-caption data and meta data accompanying the target frame as data of the target frame, and the flow proceeds to step S24.

In step S24, the category determining unit 44 sets, for example, one serving as the initial value to variable m for specifying a determination rule for determining the category of the content, which is stored in the determination rule storage unit 43, and the flow proceeds to step S25. The category determining unit 44 selects, from the determination rule storage unit 43, an m-th determination rule as a target determination rule, and the flow proceeds to step S26.

In step S26, the category determining unit 44 uses the data of the target frame, which has been obtained in step S23, to update the category parameter $P_n$ (n=1, 2, ..., N) on the basis of the target determination rule obtained in step S25.

FIG. 6 shows examples of determination rules stored in the determination rule storage unit 43 shown in FIG. 1.

For example, in the case where the target determination rule is the first determination rule in FIG. 6, namely, "when text includes baseball (live), increase the possibility of baseball by 0.5", when text data included in the data of the target frame includes character data "baseball (live)", in step S26, the category determining unit 44 updates, on the basis of the target determination rule, the category parameter $P_2$ indicating the possibility of the category being baseball by incrementing the current value by 0.5.

For example, in the case where the target determination rule is the second determination rule in FIG. 6, namely, "when audio is decoded to indicate baseball (live), increase the possibility of baseball by 0.3", when audio data included in the data of the target frame includes data corresponding to sounds of "baseball (live)", in step S26, the category determining unit 44 updates, on the basis of the target determination rule, the category parameter $P_2$ indicating the possibility of the category being baseball by incrementing the current value by 0.3.

For example, in the case where the target determination rule is the third determination rule in FIG. 6, namely, "when an image is analyzed and determined as a baseball field, increase the possibility of baseball by 0.2", when image data included in the data of the target frame includes data corresponding to an image of a baseball field, in step S26, the category determining unit 44 updates, on the basis of the target determination rule, the category parameter $P_2$ indicating the possibility of the category being baseball by incrementing the current value by 0.2.

For example, in the case where the target determination rule is the fourth determination rule in FIG. 6, namely, "when an image is analyzed to show a baseball uniform, a bat, and a ball, increase the possibility of baseball by 0.1", when image data included in the data of the target frame includes data corresponding to images of a uniform, a bat, and a ball, in step S26, the category determining unit 44 updates, on the basis of the target determination rule, the category parameter $P_2$ indicating the possibility of the category being baseball by incrementing the current value by 0.1.

For example, in the case where the target determination rule is the fifth determination rule in FIG. 6, namely, "when text is analyzed to show "script" as part of a title, increase the possibility of drama by 0.2", when text data included in the data of the target frame includes character data "script", in step S26, the category determining unit 44 updates, on the basis of the target determination rule, the category parameter $P_1$ indicating the possibility of the category being drama by incrementing the current value by 0.2.

For example, in the case where the target determination rule is the sixth determination rule in FIG. 6, namely, "when audio is analyzed to indicate drama, increase the possibility of drama by 0.1", when audio data included in the data of the target frame includes data corresponding to sounds of "drama", in step S26, the category determining unit 44 updates, on the basis of the target determination rule, the category parameter $P_1$ indicating the possibility of the category being drama by incrementing the current value by 0.1.

For example, in the case where the target determination rule is the seventh determination rule in FIG. 6, namely, "when an image is analyzed and the face of an actor often appearing in drama is recognized, increase the possibility of drama by 0.1", when image data included in the data of the target frame includes data corresponding to an actor's face image serving as a pre-registered face image, in step S26, the category determining unit 44 updates, on the basis of the target determination rule, the category parameter $P_1$ indicating the possibility of the category being drama by incrementing the current value by 0.1.

Referring back to FIG. 5, after having updated in step S26 the category parameter Pn using the data of the target frame on the basis of the target determination rule, as has been described above, in step S27, the category determining unit 44 determines whether any of the category parameters $P_1$ to $P_N$ exceeds a category determination threshold, which is a threshold determined in advance.

If it is determined in step S27 that there is a category parameter, among the category parameters $P_1$ to $P_N$, that exceeds the category determination threshold, that is, if the category parameter $P_n$ included in the category parameters $P_1$ to $P_N$ exceeds the category determination threshold, the flow proceeds to step S28, and the category determining unit 44 outputs the determination result showing that the category of the target content is the category #n corresponding to the category parameter $P_n$ to the playback instruction data generator 46. Then, the category determining process ends.

If it is determined in step S27 that none of the category parameters $P_1$ to $P_N$ exceed the category determination threshold, the flow proceeds to step S29, and the category determining unit 44 determines whether the variable m is equal to the total number M of the determination rules stored in the determination rule storage unit 43.

If it is determined in step S29 that the variable m is not equal to the total number M of the determination rules stored in the determination rule storage unit 43, the flow proceeds to step S30, and the category determining unit 44 increments the variable m by one. The flow returns to step S25, and thereafter, the similar processing is repeated.

If it is determined in step S29 that the variable m is equal to the total number M of the determination rules stored in the determination rule storage unit 43, in step S31, the category determining unit 44 determines whether all the frames of the target content have been selected as the target frame to perform the updating of the category parameters $P_1$ to $P_N$.

If it is determined in step S31 that not all of the frames of the target content have been selected as the target frame to perform the updating of the category parameters $P_1$ to $P_N$, that is, if there still is a frame in the frames of the target content that has not yet been selected as the target frame, the flow returns to step S22, and a new target frame is selected. Thereafter, the similar processing is repeated.

If it is determined in step S31 that all of the frames of the target content have been selected as the target frame to perform the updating of the category parameters $P_1$ to $P_N$, that is, if all of the frames of the target content have served as the target frame, the flow proceeds to step S32, and the category determining unit 44 outputs the determination result showing that the category of the target content is the category #n corresponding to the category parameter $P_n$ that has the maximum value among the category parameters $P_1$ to $P_N$ to the playback instruction data generator 46. Then, the category determining process ends.

Figure 7:
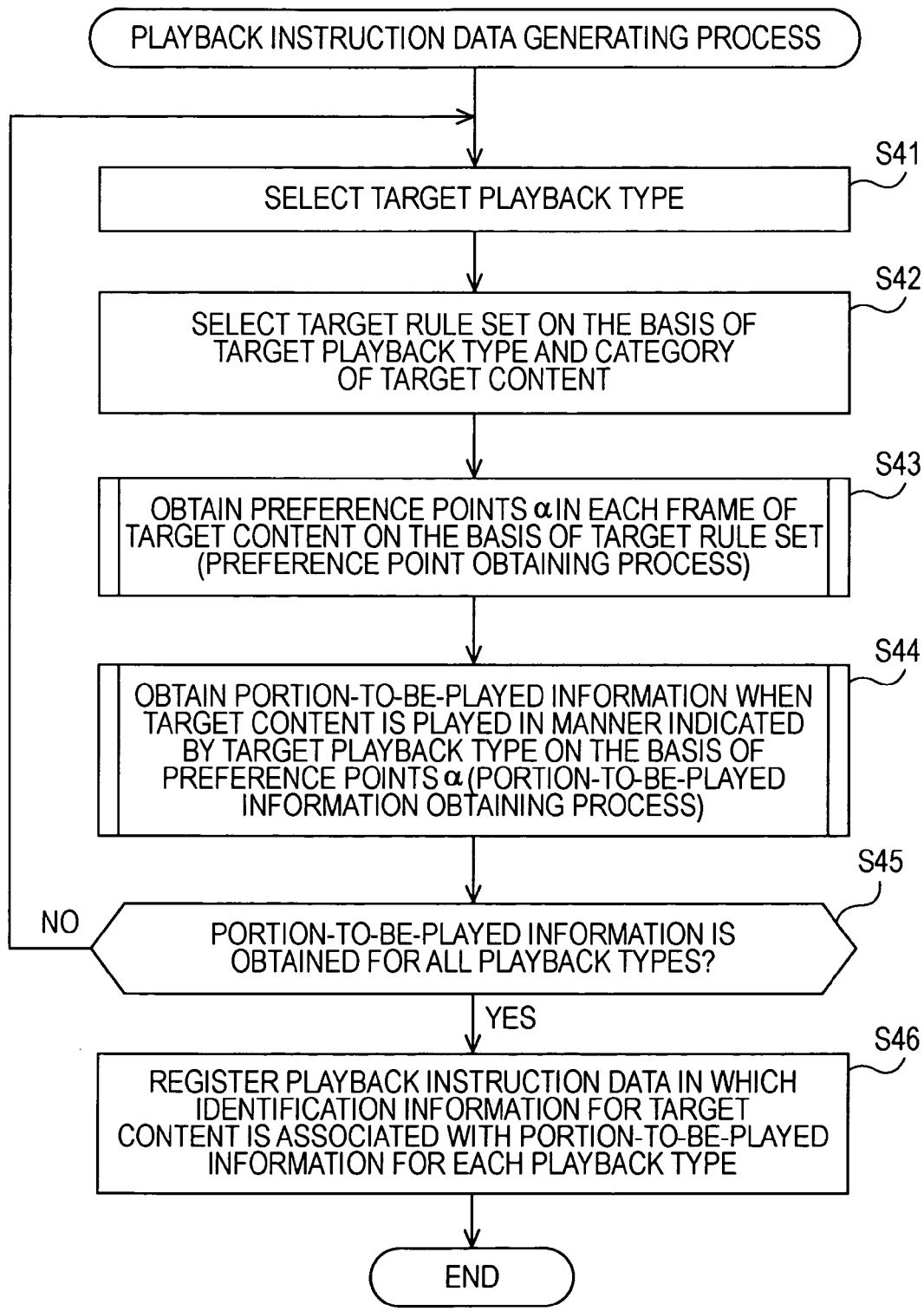
FIG. 7 is a flowchart of a playback-instruction data generating process.

With reference to the flowchart of FIG. 7, the playback instruction data generating process performed by the playback instruction data generator 46 in step S13 of FIG. 4 will be described in detail.

In step S41 in the playback instruction data generating process, the playback instruction data generator 46 selects, from among a plurality of playback types, a playback type that has not yet been selected as a target playback type as the target playback type.

In this embodiment, the playback types include abstract playback and highlight playback. In step S41, one of abstract playback and highlight playback is selected as the target playback type.

After the processing in step S41, the flow proceeds to step S42, and the playback instruction data generator 46 selects, on the basis of the target playback type and the category of the target content, which has been output as a result of the category determining process (FIG. 5) performed by the category determining unit 44, from among playback rules stored in the playback rule storage unit 45, a set of playback rules corresponding to the target playback type and the category of the target content as a target rule set.

FIG. 8 schematically shows examples of playback rules stored in the playback rule storage unit 45.

As has been described above, the playback rules are defined for each category of content and for each playback type (each type of exceptional and special playback).

In this embodiment, there are two playback types including abstract playback and highlight playback. Therefore, the playback rules are individually defied according to the category of content for abstract playback and highlight playback. In FIG. 8, the playback rules are individually defined for abstract playback and highlight playback according to the category, such as baseball, soccer, or the like.

For example, when the category of the target content is baseball and the target playback type is abstract playback, the playback instruction data generator 46 selects a set of playback rules in which the category is "baseball" and the playback type is "abstract playback" as a target rule set, as marked by slanted lines in FIG. 8.

Referring back to FIG. 7, after having selected in step S42 the target rule set, in step S43, the playback instruction data generator 46 performs a preference point obtaining process of obtaining preference points α, which will be described subsequently, in each of the frames constituting the target content on the basis of the target rule set, and the flow proceeds to step S44. The details of the preference point obtaining process performed in step S43 will be described subsequently.

In step S44, the playback instruction data generator 46 performs, on the basis of the preference points α obtained in the preference point obtaining process in step S43, a portion-to-be-played information obtaining process of obtaining portion-to-be-played information indicating a portion of the target content with specific details to be played back in exceptional and special playback indicated by the target playback type, and the flow proceeds to step S45. The details of the portion-to-be-played information obtaining process performed in step S44 will be described subsequently.

In step S45, the playback instruction data generator 46 determines whether the portion-to-be-played information has been obtained for all the playback types, that is, abstract playback and highlight playback in this embodiment.

If it is determined in step S45 that the portion-to-be-played information has not been obtained for all the playback types, the flow returns to step S41, and a playback type for which portion-to-be-played information has not yet been obtained is selected as a new target playback type, and thereafter, the similar processing is repeated.

If it is determined in step S45 that the portion-to-be-played information has been obtained for all the playback types, that is, if abstract playback and highlight playback have been selected as the target playback type and the portion-to-be-played information has been individually obtained for abstract playback and highlight playback, the flow proceeds to step S46, and the playback instruction data generator 46 associates the portion-to-be-played information individually obtained for all the playback types with the identification information for the target content, thereby generating playback instruction data for the target content. The playback instruction data generator 46 supplies the generated playback instruction data to the playback instruction data storage unit 31, and the playback instruction data storage unit 31 registers (stores) the supplied playback instruction data. Then, the playback instruction data generating process ends.

Figure 9:
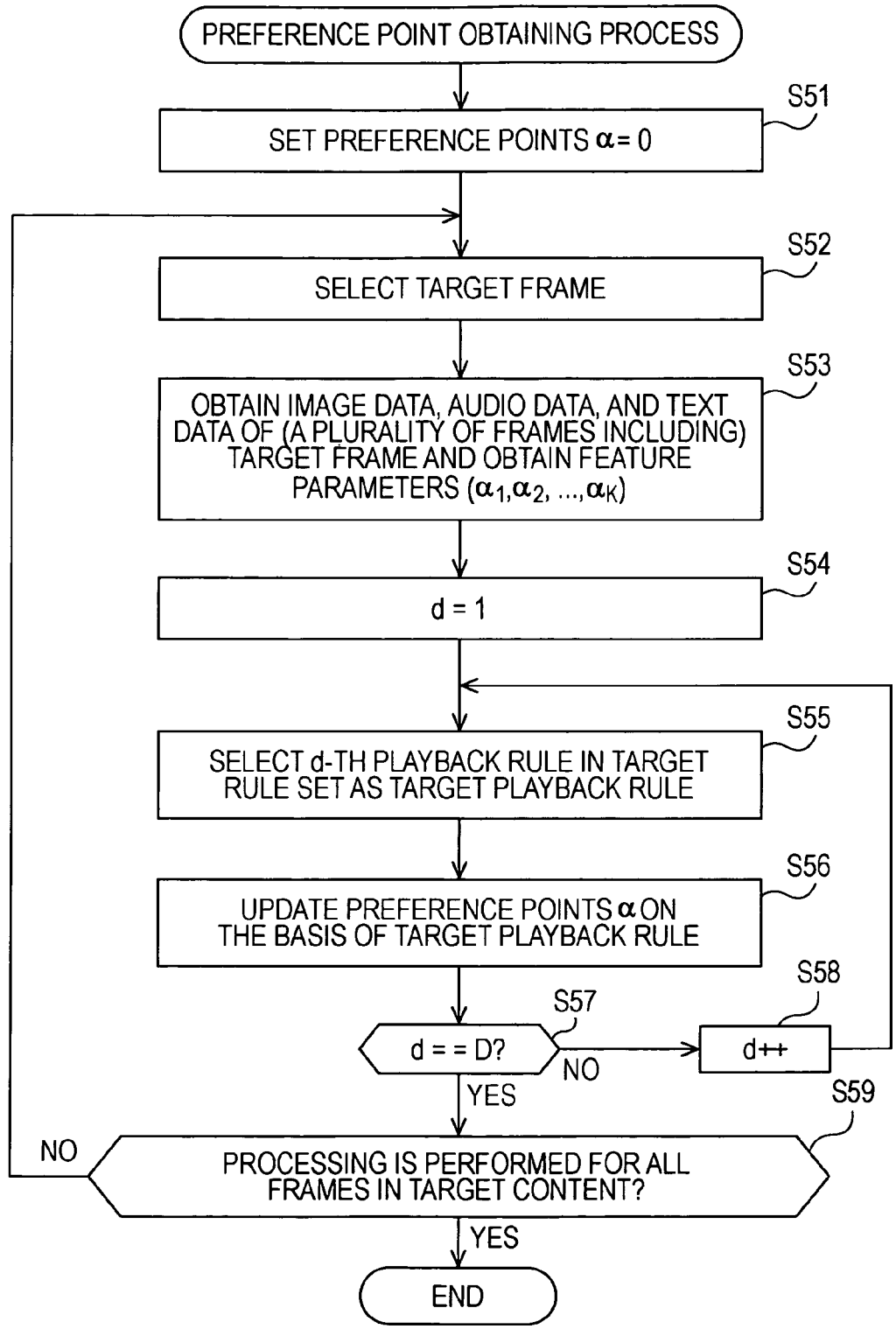
FIG. 9 is a flowchart of a preference point obtaining process.

With reference to the flowchart of FIG. 9, the preference point obtaining process performed by the playback instruction data generator 46 in step S43 of FIG. 7 will be described.

In step S51 of the preference point obtaining process, the playback instruction data generator 46 sets zero serving as the initial value to the preference points α indicating the degree of each frame constituting the target content being appropriate for a portion to be played back in exceptional and special playback indicated by the target playback type, and the flow proceeds to step S52.

In step S52, the playback instruction data generator 46 selects a certain frame of the target content as a target frame. That is, in step S52, from among time-series frames constituting the target content, the most preceding (past) frame in the time domain that has not yet been selected as a target frame is selected as the target frame.

Then, the flow proceeds from step S52 to step S53. The playback instruction data generator 46 obtains, from the target content supplied from the reader 41 and the decoding result of the target content, which has been supplied from the decoder 42, image data of the target frame, audio data accompanying a plurality of frames including, preceding, and succeeding the target frame, and closed-caption data and meta data accompanying the target frame as data of the target frame. On the basis of the data of the target frame, the playback instruction data generator 46 obtains feature parameters $\alpha_1, \alpha_2, \ldots \alpha_K$ indicating feature values of the details of the target frame.

The feature parameters $\alpha_1, \alpha_2, \ldots, \alpha_K$ to be obtained in step S53 are determined in advance according to the category of content. In step S53, the playback instruction data generator 46 obtains the feature parameters $\alpha_1, \alpha_2, \ldots, \alpha_K$ determined in advance for the category of the target content.

That is, for example, when the category of the target content is baseball, features to be indicated by the feature parameters $\alpha_1, \alpha_2, \ldots, \alpha_K$ are determined in advance such that, for example, the feature parameter $\alpha_1$ indicates runs, the feature parameter $\alpha_2$ indicates the presence of a runner at first base, the feature parameter $\alpha_3$ indicates the presence of a runner at second base, the feature parameter $\alpha_4$ indicates the presence of a runner at third base, the feature parameter $\alpha_5$ indicates the level of cheering, and the feature parameter $\alpha_6$ indicates the number of outs.

In step S53, the playback instruction data generator 46 obtains the feature parameters $\alpha_1, \alpha_2, \ldots, \alpha_K$ on the basis of the data of the target frame.

Then, the flow proceeds from step S53 to step S54. The playback instruction data generator 46 sets, for example, one serving as the initial value to variable d for specifying a playback rule constituting the target rule set selected in step S42 of FIG. 7. In step S55, the playback instruction data generator 46 selects, from the target rule set, a d-th playback rule as a target playback rule, and the flow proceeds to step S56.

In step S56, the playback instruction data generator 46 updates, on the basis of the target playback rule obtained in step S55, the preference points $\alpha$ of the target frame using the data of the target frame, which is obtained in step S53, and the feature parameters $\alpha_1, \alpha_2, \ldots, \alpha_K$ of the target frame.

FIG. 10 shows an example of a rule set in which the category is "baseball" and the playback type is "abstract playback".

For example, in the case where the target playback rule is the first playback rule in FIG. 10, namely, "when runs in the target frame are different from runs in the immediately preceding frame, increase preference points of the target frame by 1000", when the feature parameter $\alpha_1$ indicating runs in the target frame is different from the feature parameter $\alpha_1$ indicating runs in the immediately preceding frame, which is one frame before the target frame, in step S56, the playback instruction data generator 46 updates, on the basis of the target playback rule, the preference points $\alpha$ of the target frame by incrementing the current value by 1000.

For example, in the case where the target playback rule is the second playback rule in FIG. 10, namely, "when a runner in the target frame is different from that in the immediately preceding frame, increase preference points of the target frame by 100", when the feature parameters $\alpha_2, \alpha_3,$ and $\alpha_4$ each indicating the presence of a runner in the target frame are different from the feature parameters $\alpha_2, \alpha_3,$ and $\alpha_4$ each indicating the presence of a runner in the immediately preceding frame, in step S56, the playback instruction data generator 46 updates, on the basis of the target playback rule, the preference points $\alpha$ of the target frame by incrementing the current value by 100.

For example, in the case where the target playback rule is the third playback rule in FIG. 10, namely, "when the level of cheering in the target frame is higher than that in the immediately preceding frame, increase preference points by a value calculated by dividing the difference by the maximum cheering level and multiplying the quotient by 10", when the feature parameter $\alpha_5$ indicating the level of cheering in the target frame is greater than the feature parameter $\alpha_5$ indicating the level of cheering in the immediately preceding frame, in step S56, the playback instruction data generator 46 updates, on the basis of the target playback rule, the preference points $\alpha$ of the target frame by incrementing the current value by a predetermined value. The predetermined value is calculated, on the basis of the target playback rule, by dividing the difference between the feature parameter $\alpha_5$ indicating the level of cheering in the target frame and the feature parameter $\alpha_5$ indicating the level of cheering in the immediately preceding frame by the maximum value MAX of the feature parameter $\alpha_5$ indicating the maximum level of cheering among the frames constituting the target content and multiplying the quotient by 10.

For example, in the case where the target playback rule is the fourth playback rule in FIG. 10, namely, "when audio is analyzed to detect a high sound generated upon hitting a ball with a bat, increase preference points by 1", when audio data included in the data of the target frame includes data corresponding to "a high sound generated upon hitting a ball with a bat", in step S56, the playback instruction data generator 46 updates, on the basis of the target playback rule, the preference points $\alpha$ of the target frame by incrementing the current value by 1.

For example, in the case where the target playback rule is the fifth playback rule in FIG. 10, namely, "when the number of outs in the target frame is greater than that in the immediately preceding frame, increase preference points by 5", when the feature parameter $\alpha_6$ indicating the number of outs in the target frame is greater than the feature parameter $\alpha_6$ indicating the number of outs in the immediately preceding frame, in step S56, the playback instruction data generator 46 updates, on the basis of the target playback rule, the preference points $\alpha$ of the target frame by incrementing the current value by 5.

For example, in the case where the target playback rule is the sixth playback rule in FIG. 10, namely, "when the number of outs in the target frame is less than that in the immediately preceding frame, increase preference points by 50", when the feature parameter $\alpha_6$ indicating the number of outs in the target frame is less than the feature parameter $\alpha_6$ indicating the number of outs in the immediately preceding frame, in step S56, the playback instruction data generator 46 updates, on the basis of the target playback rule, the preference points $\alpha$ of the target frame by incrementing the current value by 50.

Referring back to FIG. 9, after having updated in step S56 the preference points $\alpha_n$, as has been described above, in step S57, the playback instruction data generator 46 determines whether the variable d is equal to the total number D of the playback rules constituting the target rule set.

If it is determined in step S57 that the variable d is not equal to the total number D of the playback rules constituting the target rule set, the flow proceeds to step S58, and the playback instruction data generator 46 increments the variable d by one. The flow returns to step S55, and thereafter, the similar processing is repeated.

If it is determined in step S57 that the variable d is equal to the total number D of the playback rules constituting the target rule set, the flow proceeds to step S59, and the playback instruction data generator 46 determines whether all the frames of the target content have been selected as the target frame to obtain the preference points $\alpha$.

If it is determined in step S59 that the preference points $\alpha$ have not been obtained for all the frames of the target content, the flow returns to step S52, and a new target frame is selected. Thereafter, the similar processing is repeated.

If it is determined in step S59 that all the frames of the target content have been selected to obtain the preference points $\alpha$, the playback instruction data generator 46 ends the preference point obtaining process.

With reference to the flowchart of FIG. 11, the portion-to-be-played information obtaining process performed by the playback instruction data generator 46 in step S44 of FIG. 7 will be described.

In step S71 of the portion-to-be-played information obtaining process, the playback instruction data generator 46 obtains set time T determined in advance as a playback time for performing exceptional and special playback of the target content, the type of which is indicated by the target playback type.

The set time T may be stored in advance as part of a playback rule in the playback rule storage unit 45. In this case, the playback instruction data generator 46 obtains the set time T by reading it from the playback rule storage unit 45.

In addition, a rule for calculating the set time T may be stored in advance as part of a playback rule in the playback rule storage unit 45. In this case, if the rule for calculating the set time T defines, for example, that the set time T is one-tenth of the total playback time of the entire content, the playback instruction data generator 46 obtains the set time T by calculating one-tenth of the total playback time of the entire target content.

Also, the set time T may be set equal to an arbitrary value, such as one minute or ten minutes, by the user operating the remote commander 1.

After the processing in step S71, the flow proceeds to step S72. The playback instruction data generator 46 searches for a point-maximum frame in which the preference points are maximum in the frames constituting the target content that have not yet been selected as frames to be played back in exceptional and special playback indicated by the target playback type (hereinafter may also be referred to as "unselected frames"), and the flow proceeds to step S73.

In step S73, the playback instruction data generator 46 selects frames to be played back from among the unselected frames of the target content on the basis of the point-maximum frame searched for in the previous step S72.

That is, the playback instruction data generator 46 selects, for example, a scene including the point-maximum frame, that is, frames from a frame immediately after a scene change that appears immediately before the point-maximum frame to a frame immediately after a scene change that appears immediately after the point-maximum frame, as the frames to be played back.

Then, the flow proceeds from step S73 to step S74, and the playback instruction data generator 46 determines whether the total playback time of the frames to be played back, which are selected from the target content, is greater than or equal to the set time T.

If it is determined in step S74 that the total playback time of the frames to be played back, which are selected from the target content, is not greater than or equal to the set time T, that is, if the total playback time of the frames to be played back, which are selected from the target content, is less than the set time T, the flow returns to step S72, and the unselected frames of the target content are again searched for the point-maximum frame in which the reference points are maximum. Thereafter, the similar processing is repeated.

If it is determined in step S74 that the total playback time of the frames to be played back, which are selected from the target content, is greater than or equal to the set time T, that is, if the total playback time of the frames to be played back, which are selected from the target content, is a time that equals or slightly exceeds the set time T, the flow proceeds to step S75, and the playback instruction data generator 46 obtains information specifying the frames to be played back, which are selected from the target content (e.g., frame numbers), as portion-to-be-played information and ends the portion-to-be-played information obtaining process.

If the total playback time of the frames to be played back, which are selected from the target content, exceeds the set time T, in step S75, the playback instruction data generator 46 may obtain information that specifies frames to be played back, which are obtained by excluding the frame lastly selected in step S73 from the frames to be played back, which are selected from the target content in step S75, as portion-to-be-played information. In this case, the total playback time of the frames indicated by the portion-to-be-played information is less than, but close to the set time T.

In this manner, the record/playback system shown in FIG. 1 obtains, with regard to playback instruction data in which portion-to-be-played information for each type (playback type) of exceptional and special playback, which indicates a portion of content with specific details to be played back in special playback (exceptional and special playback) performed according to the details of the content, is associated with identification information identifying the content, portion-to-be-played information for the playback type specified by the user, which is associated with the identification information for the content specified by the user, and extracts a portion of the content with specific details, which is indicated by the obtained portion-to-be-played information, from the content specified by the user. Therefore, various types of exceptional and special playback for playing back a portion of content with specific details, such as abstract playback for playing back only scenes that help the user understand the outline of the entire content and highlight playback for playing back only highlight scenes of the content, can be performed so that the user can understand the outline of the entire content. Thus, the usability of the player can be enhanced.

Exceptional and special playback of target content may be performed after all the pieces of playback instruction data for the target content have been obtained. Alternatively, when part of playback instruction data is obtained, exceptional and special playback of target content may be performed in parallel with the obtaining of the remaining playback instruction data.

It is not necessary that different playback rules be defined for different categories. That is, the same playback rule may be adopted for similar categories, e.g., "baseball" and "softball" or for "soccer" and "futsal".

In this embodiment, the playback instruction data generator 46 generates playback instruction data on the basis of playback rules. Alternatively, the playback instruction data generator 46 may generate playback instruction data on the basis of, for example, user information regarding a user viewing the content.

That is, the playback instruction data generator 46 may collect and analyze user information including a history of user operations on the recorder/player 2 (operation history), viewing states, or the like, and generates playback instruction data by taking into consideration the analysis result.

Specifically, for example, in the case where the user views (plays back) content that belongs to the category "baseball", the user may perform so-called skipping-playback in which high-speed playback is performed to exclusively play back scenes that the user wants to watch. Types of skipping playback include, for example, checking the end of each inning to check the score of a game, watching highlight scenes such as scenes of home runs and hits, and watching scenes of a particular ball player.

The playback instruction data generator 46 can analyze, on the basis of the user's operation history, the type of skipping playback performed by the user and generate, on the basis of the analysis result, playback instruction data so as to perform exceptional and special playback similar to the type of skipping playback performed by the user.

Also, the playback instruction data generator 46 can recognize the characteristics of the user operations, such as skipping music (theme music) at the beginning of a drama program or stopping the fast-forwarding of a baseball program at the end of each inning to perform normal playback, by analyzing the user's operation history and generate playback instruction data so as to perform exceptional and special playback as if such operations with the above-described characteristics are performed.

Also, the playback instruction data generator 46 can determine, by analyzing the user's operation history, whether the user mainly watches highlight scenes or the flow of a program according to the category of content and generate playback instruction data so as to perform exceptional and special playback of scenes appropriate for the manner in which the user watches the content.

Also, the playback instruction data generator 46 can determine the user's viewing state in which, for example, the user watches content attentively or half dozing, by analyzing, for example, an image of the user viewing the content captured with a camera and detecting the line of sight and, on the basis of the viewing state, generate playback instruction data.

Specifically, for example, a scene that the user watches attentively can be regarded as a scene that the user is interested in. Thus, the playback instruction data generator 46 can generate playback instruction data so as to perform exceptional and special playback in which scenes with characteristics similar to those of the above-described scene of interest to the user are played back. Also, for example, a scene being played back when the user is dozing can be regarded as a scene that the user is not interested in. Thus, the playback instruction data generator 46 can generate playback instruction data so as to perform exceptional and special playback in which scenes with characteristics similar to those of the above-described scene that the user is not interested in are not played back. At the same time, the scene being played back when the user is dozing can alternatively be regarded as a scene that the user has missed. Thus, the playback instruction data generator 46 can generate playback instruction data so as to perform exceptional and special playback in which the scene being played back when the user is dozing will again be played back.

Also, the playback instruction data generator 46 can recognize a particular person or object (item) of interest to the user in a scene that the user watches attentively by analyzing, for example, an image of the user viewing the content captured with a camera and detecting the line of sight and generate playback instruction data such that scenes in which that person or object appears are to be played back.

Also, the playback instruction data generator 46 can determine the viewing state in which, for example, a particular user watches content or one or a plurality of users watch content, by analyzing, for example, an image of the user(s) viewing the content captured with a camera and, on the basis of the viewing state, generate playback instruction data.

That is, for example, in the case of content including moving images of a sports day captured by a particular user whose children have participated in the sports day, when only the particular user is watching that content, the playback instruction data generator 46 can generate playback instruction data so as to perform exceptional and special playback for playing back, among scenes of many people, only scenes of the particular user's children. When a plurality of users are watching that content, the playback instruction data generator 46 can generate playback instruction data so as to perform exceptional and special playback for playing back, for example, only scenes of many people so that the users watching the content can understand the overall performance of the sports day.

In the above-described manner, according to the recorder/player 2 shown in FIG. 1, not only simple variable-speed playback or chapter playback, but also exceptional and special playback can be performed. It is thus possible to make full use of a new random-access function represented by, for example, hard disk drive (HDD) players.

According to the recorder/player 2, a portion of content belonging to an associated category to be played back in exceptional and special playback of the content is determined on the basis of the playback rules according to the category. It is thus possible to determine, within a time period not greatly exceeding the playback time of the content, a portion of the content to be played back and perform exceptional and special playback in a simplified manner.

By displaying a so-called film roll image in which the first frames of scenes included in a portion(s) of content to be played back are arranged in the shape of a film roll, the user can easily understand the details of the content and, for example, effortlessly find a desired piece of content from many pieces of content.

With exceptional and special playback including abstract playback and highlight playback, the user can watch many pieces of content in a short period of time.

Generation of playback instruction data can be regarded, from another point of view, as automatic editing. When the user wants to show content to other people, the user does not have to edit the content.

The above-described consecutive processing may be performed either by hardware or by software. When the above-described processing is performed by software, programs constituting the software are installed in a general-purpose computer or the like.

Figure 12:
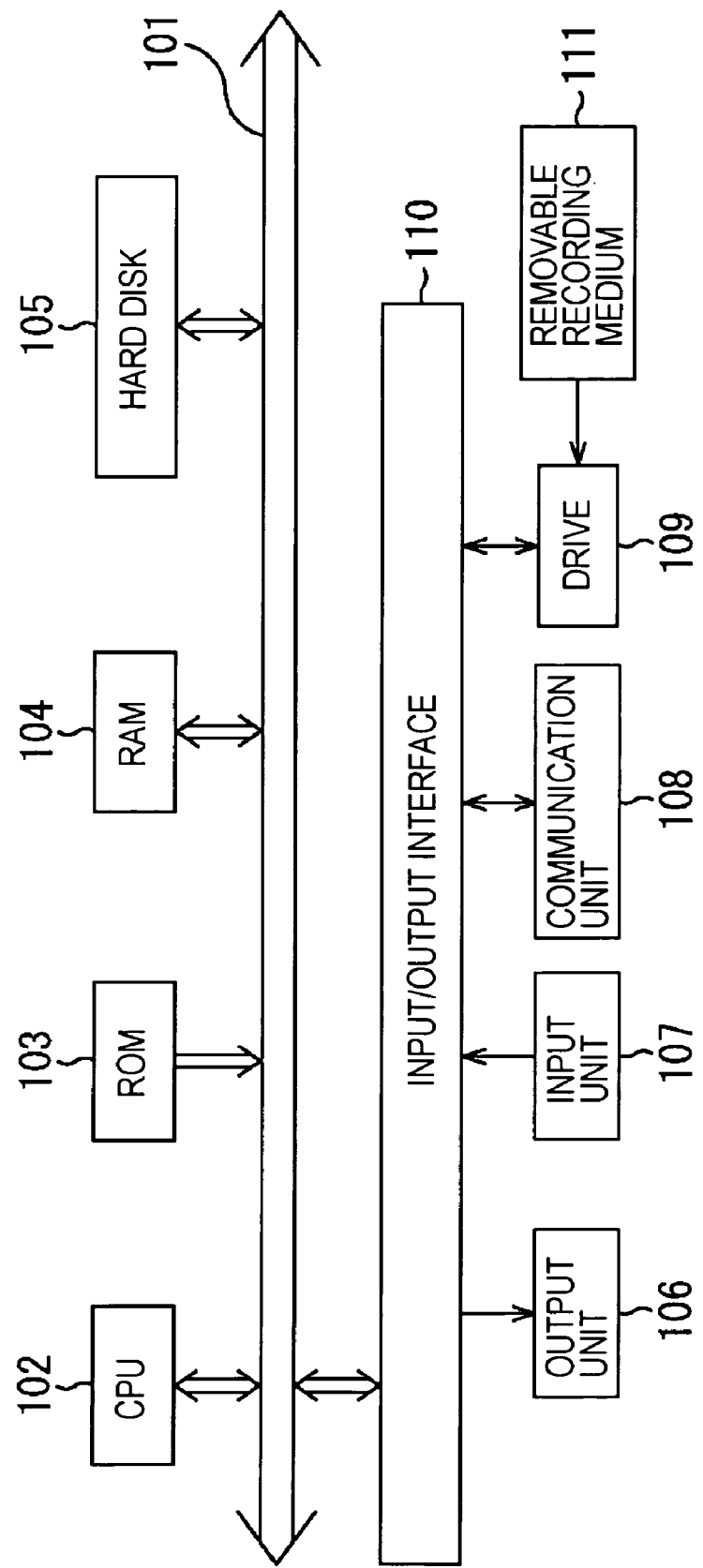
FIG. 12 is a block diagram of an example of the configuration of a computer according to an embodiment of the present invention.

FIG. 12 shows an example of the configuration of an embodiment of a computer into which a program for executing the above-described processing is installed.

The program can be recorded in advance on an internal hard disk 105 in the computer or a read-only memory (ROM) 103.

Alternatively, the program can be temporally or eternally stored (recorded) on a removable recording medium 111 such as a flexible disk, a compact disc read-only memory (CD-ROM), a magneto-optical (MO) disk, a digital versatile disc (DVD), a magnetic disk, a semiconductor memory, or the like. The removable recording medium 111 can be provided as so-called packaged software.

Other than installing the program in the computer from the removable recording-medium 111 described above, the program may be transferred to the computer from a download site by radio via satellite for digital satellite broadcasting, or may be transferred to the computer by wire via a network such as a local area network (LAN) or the Internet. The transferred program is thus received by a communication unit 108 in the computer and is installed in the internal hard disk 105.

The computer includes an internal central-processing unit (CPU) 102. The CPU 102 is connected to an input/output interface 110 via a bus 101. When a user, for example, operates an input unit 107, such as a keyboard, a mouse, or a microphone, so as to input a command to the CPU 102 via the input/output interface 110, a program stored on the ROM 103 is executed. Alternatively, a program stored on the hard disk 105, a program that is transferred via satellite or network, received by the communication unit 108, and then installed on the hard disk 105, or a program that is read out from the removable recording medium 111 mounted on a drive 109 and installed on the hard disk 105 may be loaded onto a random-access memory (RAM) 104 so that the program is executed by the CPU 102. Consequently, the CPU 102 performs the processing according to the flowcharts described previously or the processing according to the block diagrams described above. If necessary, for example, the CPU 102 outputs the result of the processing from an output unit 106, such as a liquid crystal display (LCD) or a speaker, via the input/output interface 110. Alternatively, the result of the processing may be transmitted via the communication unit 108, or may be, for example, written onto the hard disk 105.

In this description, the steps describing the program for the computer to perform various types of processing are not necessarily performed in the time order of the flowcharts described above. The steps may be performed in parallel or individually (for example, by parallel processing or by object-oriented processing).

The program may be either operated with one computer or operated with multiple computers in a distributed manner. Furthermore, the program may be transferred to a remote computer so as to be executed in that computer.

Content is not limited to moving images and may include still images, audio data, or the like.

The content storage unit 22 for recording content and the playback instruction data storage unit 31 for storing playback instruction data may be implemented using different recording media or a single recording medium.

Although exceptional and special playback includes abstract playback and highlight playback in this embodiment, the types of exceptional and special playback are not limited thereto. That is, for example, playback according to the details of content, such as star playback in which a particular object or person is indicated by an image or characters and scenes of the particular object or person are mainly played back or combo-playback in which, when a plurality of pieces of content are consecutively played back, overlapping portions among the pieces of content are excluded to perform playback, can be adopted as exceptional and special playback.

The recorder/player 2 shown in FIG. 1 is applicable to, for example, an HDD recorder, a server for saving and distributing content, which is connected to a so-called home network, or an application program for allowing a computer to record and play back content including images or the like.

Portion-to-be-played information for content may be multiplexed onto the content.

In the portion-to-be-played information obtaining process shown in FIG. 11, frames constituting a scene including frames with preference points that are greater than or equal to a predetermined threshold may be selected as frames to be played back.

It should be understood by those skilled in the art that various modifications, combinations, sub-combinations and alterations may occur depending on design requirements and other factors insofar as they are within the scope of the appended claims or the equivalents thereof.

What is claimed is:

1. A playback system for playing back content, comprising:
  a category determining unit that determines a category, out of a plurality of categories, of a target content as a whole;
  a playback instruction data generator that determines a portion of the target content with specific details to be played back for a user in special playback of the target content, on the basis of a playback rule for the category of the target content, among playback rules, which are defined separately for each of the plurality of categories and for each type of special playback according to the details of the target content, the playback rules being used for determining a portion of the target content with specific details to be played back in special playback of the target content, and the playback instruction data generator generates playback instruction data in which portion-to-be-played information indicating the portion of the target content with the specific details to be played back is associated with identification information identifying the target content, wherein there are a plurality of types of special playback and each type of special playback is video content to be played for the user that includes a portion of the target content and not the entire target content, the types of special playback including abstract playback and highlight playback;
  an obtaining unit that obtains the portion-to-be-played information for the type of special playback specified by the user, the portion-to-be-played information being included in the playback instruction data and being associated with the identification information for the target content specified by the user; and
  an extracting unit that extracts, from the target content specified by the user, a portion of the target content with the specific details, which is indicated by the portion-to-be-played information obtained by the obtaining unit.

2. The playback system according to claim 1, wherein the category determining unit determines the category on the basis of a result of recognizing characters, an image, or a sound included in the target content.

3. The playback system according to claim 1, wherein the category determining unit determines the category using meta data or closed captions included in the target content or program guide information.

4. The playback system according to claim 1, wherein the playback rules are updated.

5. The playback system according to claim 1, wherein the playback rules are provided from a site on the Internet.

6. The playback system according to claim 1, wherein the playback rules are broadcast via data broadcasting and updated.

7. A playback apparatus for playing back content, comprising:
  an obtaining unit that obtains, from playback instruction data in which portion-to-be-played information indicating a portion of target content with specific details to be played back for a user in special playback according to the details of the target content which is associated with identification information identifying the target content, the portion-to-be-played information for the type of special playback specified by a user, wherein the portion-to-be-played information is associated with the identification information for the target content specified by the user; and
  an extracting unit that extracts, from the target content specified by the user, a portion of the target content with specific details, which is indicated by the portion-to-be-played information obtained by the obtaining unit,
  wherein the playback instruction data is generated by determining the portion of the target content with specific details to be played back for the user in special playback of the target content, on the basis of a playback rule for a category, out of a plurality of categories, of the target content as a whole, among playback rules, which are defined separately for each of the plurality of categories and for each type of special playback, the playback rules being used for determining a portion of the target content with specific details to be played back in special playback of the target content, and by associating the portion-to-be-played information indicating the portion of the target content with the specific details to be played back with the identification information identifying the target content, wherein there are a plurality of types of special playback and each type of special playback is video content to be played for the user that includes a portion of the target content and not the entire target content, the types of special playback including abstract playback and highlight playback.

8. A method of playing back content, implemented on a playback apparatus, comprising the steps of:
obtaining, from playback instruction data in which portion-to-be-played information indicating a portion of target content with specific details to be played back for a user in special playback according to the details of the target content which is associated with identification information identifying the target content, the portion-to-be-played information for the type of special playback specified by the user, wherein the portion-to-be-played information is associated with the identification information for the target content specified by the user; and
extracting, from the target content specified by the user, a portion of the target content with specific details, which is indicated by the obtained portion-to-be-played information,
wherein the playback instruction data is generated by determining the portion of the target content with specific details to be played for the user in special playback of the target content, on the basis of a playback rule for a category, out of a plurality of categories, of the target content as a whole, among playback rules, which are defined separately for each of the plurality of categories and for each type of special playback, the playback rules being used for determining a portion of the target content with specific details to be played back in special playback of the target content, and by associating the portion-to-be-played information indicating the portion of the target content with the specific details to be played back with the identification information identifying the target content, wherein there are a plurality of types of special playback and each type of special playback is video content to be played for the user that includes a portion of the target content and not the entire target content, the types of special playback including abstract playback and highlight playback.

9. A non-transitory computer-readable storage medium storing a program for allowing a computer to execute a process of playing back content, the process comprising the steps of:
obtaining, from playback instruction data in which portion-to-be-played information indicating a portion of target content with specific details to be played back for a user in special playback according to the details of the target content which is associated with identification information identifying the target content, the portion-to-be-played information for the type of special playback specified by the user, wherein the portion-to-be-played information is associated with the identification information for the target content specified by the user; and
extracting, from the target content specified by the user, a portion of the target content with specific details, which is indicated by the obtained portion-to-be-played information,
wherein the playback instruction data is generated by determining the portion of the target content with specific details to be played for the user in special playback of the target content, on the basis of a playback rule for a category, out of a plurality of categories, of the target content as a whole, among playback rules, which are defined separately for each of the plurality of categories and for each type of special playback, the playback rules being used for determining a portion of the target content with specific details to be played back in special playback of the target content, and by associating the portion-to-be-played information indicating the portion of the target content with the specific details to be played back with the identification information identifying the target content, wherein there are a plurality of types of special playback and each type of special playback is video content to be played for the user that includes a portion of the target content and not the entire target content, the types of special playback including abstract playback and highlight playback.

10. An information processing apparatus for processing content, comprising:
a category determining unit that determines a category, out of a plurality of categories, of a target content as a whole; and
a playback instruction data generator that determines a portion of the target content with specific details to be played back for a user in special playback of the target content, on the basis of a playback rule for the category of the target content, among playback rules, which are defined separately for each of the plurality of categories and for each type of special playback according to the details of the target content, the playback rules being used for determining a portion of the target content with specific details to be played back in special playback of the target content, and the playback instruction generator generates playback instruction data in which portion-to-be-played information indicating the portion of the target content with the specific details to be played back is associated with identification information identifying the target content, wherein there are a plurality of types of special playback and each type of special playback is video content to be played for the user that includes a portion of the target content and not the entire target content, the types of special playback including abstract playback and highlight playback.

11. The information processing apparatus according to claim 10, wherein the playback instruction data generator generates the playback instruction data on the basis of information regarding a user viewing the target content.

12. The information processing apparatus according to claim 10, wherein the playback instruction data generator determines the portion of the target content with the specific details to be played back in the special playback of the target content so that the total playback time of playing back the portion of the target content with the specific details to be played back is a set time determined in advance or close to the set time.

13. An information processing method of processing content, implemented on information processing apparatus, comprising the steps of:
determining the category, out of a plurality of categories, of a target content as a whole; and
determining a portion of the target content with specific details to be played back for a user in special playback of the target content, on the basis of a playback rule for the category of the target content, among playback rules, which are defined separately for each of the plurality of categories and for each type of special playback according to the details of the target content, the playback rules being used for determining a portion of the target content with specific details to be played back in special playback of the target content, and generating playback instruction data in which portion-to-be-played information indicating the portion of the target content with the specific details to be played back is associated with identification information identifying the target content, wherein there are a plurality of types of special playback and each type of special playback is video content to be played for the user that includes a portion of the target content and not the entire target content, the types of special playback including abstract playback and highlight playback.

14. A non-transitory computer-readable storage medium storing a program for allowing a computer to perform an information processing process of processing content, the process comprising the steps of:

determining the category, out of a plurality of categories, of a target content as a whole; and determining a portion of the target content with specific details to be played back for a user in special playback of the target content, on the basis of a playback rule for the category of the target content, among playback rules, which are defined separately for each of the plurality of categories and for each type of special playback according to the details of the target content, the playback rules being used for determining a portion of the target content with specific details to be played back in special playback of the target content, and generating playback instruction data in which portion-to-be-played information indicating the portion of the target content with the specific details to be played back is associated with identification information identifying the target content, wherein there are a plurality of types of special playback and each type of special playback is video content to be played for the user that includes a portion of the target content and not the entire target content, the types of special playback including abstract playback and highlight playback.

15. The playback system according to claim 1, wherein the abstract playback includes a portion of the target content that occurs near the beginning of the target content.

16. The playback system according to claim 1, wherein the highlight playback includes a portion of the target content that occurs near the end of an identified event within the target content.

* * * * *